(12) United States Patent
Kabuto et al.

(10) Patent No.: US 11,479,020 B2
(45) Date of Patent: Oct. 25, 2022

(54) CARBON NANOTUBE SHEET STRUCTURE AND LAMINATE

(71) Applicants: LINTEC CORPORATION, Tokyo (JP); LINTEC OF AMERICA, INC., Phoenix, AZ (US)

(72) Inventors: Akio Kabuto, Tokyo (JP); Masaharu Ito, Phoenix, AZ (US); Kanzan Inoue, Phoenix, AZ (US)

(73) Assignees: LINTEC CORPORATION, Tokyo (JP); LINTEC OF AMERICA, INC., Phoenix, AZ (US)

( * ) Notice: Subject to any disclaimer, the term of this patent is extended or adjusted under 35 U.S.C. 154(b) by 227 days.

(21) Appl. No.: 16/094,446

(22) PCT Filed: Apr. 25, 2017

(86) PCT No.: PCT/JP2017/016312
§ 371 (c)(1),
(2) Date: Oct. 17, 2018

(87) PCT Pub. No.: WO2017/188228
PCT Pub. Date: Nov. 2, 2017

(65) Prior Publication Data
US 2019/0118512 A1    Apr. 25, 2019

(30) Foreign Application Priority Data

Apr. 25, 2016  (JP) .............................. JP2016-087485

(51) Int. Cl.
*B32B 27/08* (2006.01)
*B32B 9/04* (2006.01)
(Continued)

(52) U.S. Cl.
CPC .............. *B32B 9/047* (2013.01); *B32B 27/08* (2013.01); *B82B 1/00* (2013.01); *B82Y 30/00* (2013.01);
(Continued)

(58) Field of Classification Search
CPC . B32B 9/047; B32B 2313/04; B32B 2305/10; B82B 1/00; B82Y 30/00; C01B 32/158–159; C01B 32/15; D01F 9/12
(Continued)

(56) References Cited

U.S. PATENT DOCUMENTS

2010/0270911 A1    10/2010  Liu et al.
2010/0310809 A1*   12/2010  Jiang ........................ B32B 5/26
                                                              428/41.8
2012/0070625 A1     3/2012  Liu et al.

FOREIGN PATENT DOCUMENTS

JP    2010-254571 A    11/2010
JP    2012-205198 A    10/2012
(Continued)

OTHER PUBLICATIONS

International Preliminary Report on Patentability dated Oct. 30, 2018, issued in corresponding International Patent Application No. PCT/JP2017/016312.
(Continued)

*Primary Examiner* — Matthew D Matzek
(74) *Attorney, Agent, or Firm* — McDermott Will & Emery LLP

(57) ABSTRACT

A carbon nanotube sheet structure includes: a carbon nanotube sheet; a first base material including a first base material surface facing the carbon nanotube sheet; and a first spacer providing a gap between the carbon nanotube sheet and the first base material. A first base material surface of the first base material includes a first region on which the first spacer
(Continued)

US 11,479,020 B2

Page 2 is provided and a second region on which the first spacer is provided. The first base material is spaced apart from the carbon nanotube sheet at the second region on the first base material surface.

19 Claims, 18 Drawing Sheets

(51) Int. Cl.
*B82Y 30/00* (2011.01)
*C01B 32/158* (2017.01)
*B82B 1/00* (2006.01)
*D01F 9/12* (2006.01)

(52) U.S. Cl.
CPC ........ *C01B 32/158* (2017.08); *B32B 2313/04* (2013.01); *D01F 9/12* (2013.01)

(58) Field of Classification Search
USPC ........ 977/742, 750, 752, 755; 428/343, 352, 428/354, 364, 367; 423/447.1, 447.2, 423/445 B See application file for complete search history.

(56) References Cited

FOREIGN PATENT DOCUMENTS

| JP | 5255021 B2 | 8/2013 | |
| WO | 2011/024539 A1 | 3/2011 | |
| WO | WO-2011024539 A1 * | 3/2011 | ........... C01B 33/043 |

OTHER PUBLICATIONS

International Search Report issued in corresponding International Patent Application No. PCT/JP2017/016312, dated Aug. 1, 2017, with English Translation.

* cited by examiner

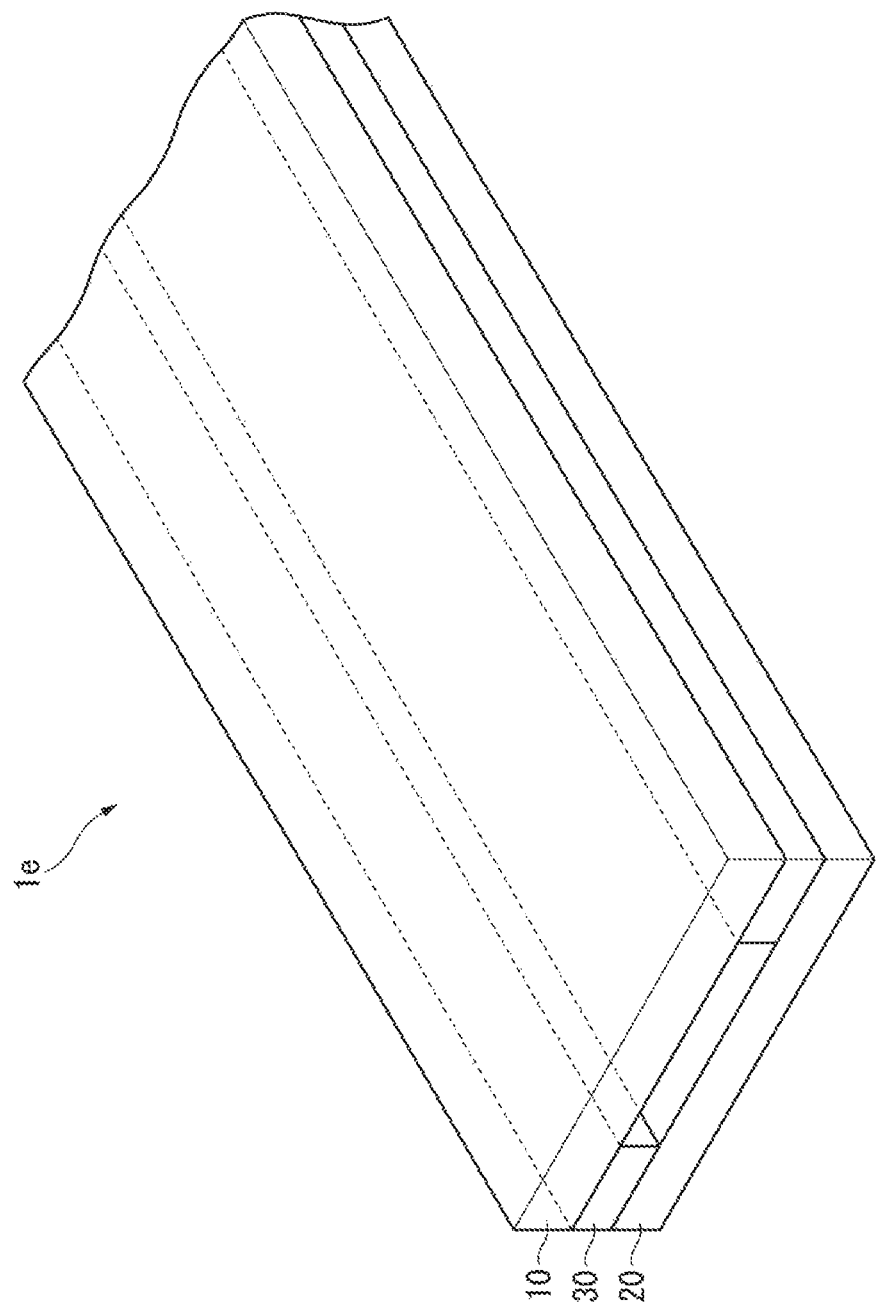

CARBON NANOTUBE SHEET STRUCTURE AND LAMINATE

CROSS REFERENCE

This application is the U.S. National Phase under 35 U.S.C. § 371 of International Application No. PCT/JP2017/016312, filed on Apr. 25, 2017, which claims the benefit of Japanese Application No. 2016-087485, filed on Apr. 25, 2016, the entire contents of each are hereby incorporated by reference.

TECHNICAL FIELD

The present invention relates to a carbon nanotube sheet structure and a laminate.

BACKGROUND ART

A sheet using carbon nanotube has been known. Patent Literature 1 discloses a carbon nanotube structure including at least one drawn carbon nanotube film and two protection films. In the carbon nanotube structure disclosed in Patent Literature 1, the carbon nanotube film is interposed between the two protection films. Each of the protection films includes a protection base film and a release layer. Patent Literature 1 also discloses that the carbon nanotube film interposed between the protection films can be placed while being stacked.

CITATION LIST

Patent Literature(s)

Patent Literature 1 Japanese Patent No. 5255021

SUMMARY OF THE INVENTION

Problem(s) to be Solved by the Invention

In order to take out only the carbon nanotube film from the carbon nanotube structure disclosed in Patent Literature 1 for use, it is necessary to peel the two protection films from the carbon nanotube film. However, since the carbon nanotube film is sticky, when one of the protection films is peeled off and then the other one of protection films is to be peeled off, the carbon nanotube film remains to be adhered on the other one of the protection films, so that the carbon nanotube film may be torn. In addition, it is difficult to restore the carbon nanotube film to a free-standing condition (i.e. self-supported without being covered with the protection films).

An object of the invention is to provide a carbon nanotube sheet structure and a laminate that are configured so that the carbon nanotube sheet can be taken out without being torn in use and can be placed while being stacked.

Means for Solving the Problem(s)

A carbon nanotube sheet structure according to an aspect of the invention includes: a carbon nanotube sheet including a plurality of carbon nanotubes arrayed preferentially in one direction in a sheet surface; a first base material including a first base material surface facing the carbon nanotube sheet; and a first spacer configured to provide a gap between the carbon nanotube sheet and the first base material, in which the first base material surface of the first base material includes: a first region on which the first spacer is provided; and a second region on which the first spacer is not provided, and the first base material is spaced apart from the carbon nanotube sheet at the second region of the first base material surface.

In the carbon nanotube sheet structure according to the above aspect of the invention, it is preferable that the carbon nanotube sheet structure further includes a second spacer, in which the first base material includes a second base material surface opposite the first base material surface, the second spacer is provided on the second base material surface, and a position of the first spacer provided on the first base material surface and a position of the second spacer provided on the second base material surface are aligned in a cross section of the carbon nanotube sheet structure in a thickness direction.

In the carbon nanotube sheet structure according to the above aspect of the invention, it is preferable that the carbon nanotube sheet includes: a first sheet surface on which the first spacer is provided; and a second sheet surface opposite the first sheet surface, and the carbon nanotube structure further includes a second base material including a third base material surface facing the second sheet surface of the carbon nanotube sheet.

In the carbon nanotube sheet structure according to the above aspect of the invention, it is preferable that the carbon nanotube sheet is disposed on the third base material surface.

In the carbon nanotube sheet structure according to the above aspect of the invention, it is preferable that a surface roughness $Ra_1$ of the third base material surface is 0.05 μm or more.

In the carbon nanotube sheet structure according to the above aspect of the invention, it is preferable that a surface roughness $Ra_1$ of the third base material surface is 10 μm or less.

In the carbon nanotube sheet structure according to the above aspect of the invention, it is preferable that the carbon nanotube sheet includes: a first sheet face on which the first spacer is provided; and a second sheet surface opposite the first sheet surface, the carbon nanotube structure further includes: a third base material including a fourth base material surface facing the second sheet surface of the carbon nanotube sheet; and a second spacer configured to provide a gap between the carbon nanotube sheet and the third base material, the fourth base material surface of the third base material includes: a third region on which the second spacer is provided; and a fourth region on which the second spacer is not provided, the third base material is spaced apart from the carbon nanotube sheet in the fourth region of the fourth base material surface, and a position of the first spacer disposed between the first base material and the carbon nanotube sheet and a position of the second spacer disposed between the third base material and the carbon nanotube sheet are aligned in a cross section of the carbon nanotube sheet structure in a thickness direction.

In the carbon nanotube sheet structure according to the above aspect of the invention, it is preferable that the carbon nanotube sheet structure further includes a fourth base material including a fifth base material surface facing the first base material surface of the first base material, in which the first spacer is disposed between the first base material and the fourth base material, the fifth base material surface of the fourth base material includes: a fifth region on which the first spacer is provided; and a sixth region on which the first spacer is not provided, and the carbon nanotube sheet is spaced apart from the second region on the first base material surface and is disposed on the sixth region of the fifth base material surface.

In the carbon nanotube sheet structure according to the above aspect of the invention, it is preferable that a surface roughness $Ra_1$ of the sixth region of the fifth base material surface is 0.05 μm or more.

In the carbon nanotube sheet structure according to the above aspect of the invention, it is preferable that a surface roughness $Ra_1$ of the sixth region of the fifth base material surface if 10 μm or less.

A laminate according to another aspect of the invention includes the carbon nanotube sheet structure according to the above aspect of the invention, the carbon nanotube sheet structure including a plurality of carbon nanotube sheet structures that are layered with each other.

A laminate according to still another aspect of the invention includes a plurality of carbon nanotube sheet structures that are layered with each other, in which each of the carbon nanotube sheet structures includes: a carbon nanotube sheet including a plurality of carbon nanotubes arrayed preferentially in one direction in a sheet surface; a fifth base material including a sixth base material surface facing the carbon nanotube sheet and a seventh base material surface opposite the sixth base material surface; and a third spacer provided on the seventh base material surface, the seventh base material surface includes: a seventh region on which the third spacer is provided; and an eighth region on which the third spacer is not provided, and when the plurality of carbon nanotube sheet structures are layered with each other, the carbon nanotube sheet is spaced apart from the eighth region on the seventh base material surface.

In the laminate according to the above aspect of the invention, it is preferable that the carbon nanotube sheet in each of the carbon nanotube sheet structures is disposed on the fifth base material, and a surface roughness $Ra_1$ of the sixth base material surface if 0.05 μm or more.

In the carbon nanotube sheet structure according to the above aspect of the invention, it is preferable that a surface roughness $Ra_1$ of the sixth base material surface if 10 μm or less.

According to the above aspects of the invention, a carbon nanotube sheet structure and a laminate, which are configured so that the carbon nanotube sheet can be taken out without being torn in use and can be placed while being stacked, can be provided.

BRIEF DESCRIPTION OF DRAWING(S)

FIG. 4 is a perspective view of a carbon nanotube sheet structure according to a modification of the first exemplary embodiment.

DESCRIPTION OF EMBODIMENT(S)

First Exemplary Embodiment

Figure 1:
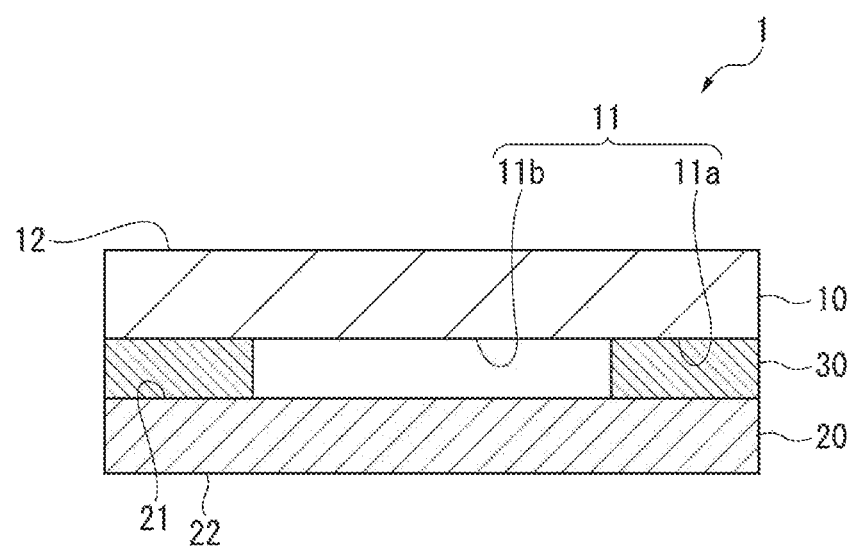
FIG. 1 is a cross section of a carbon nanotube sheet structure according to a first exemplary embodiment.

FIG. 1 is a cross section of a carbon nanotube sheet structure 1 according to a first exemplary embodiment.

Figure 2:
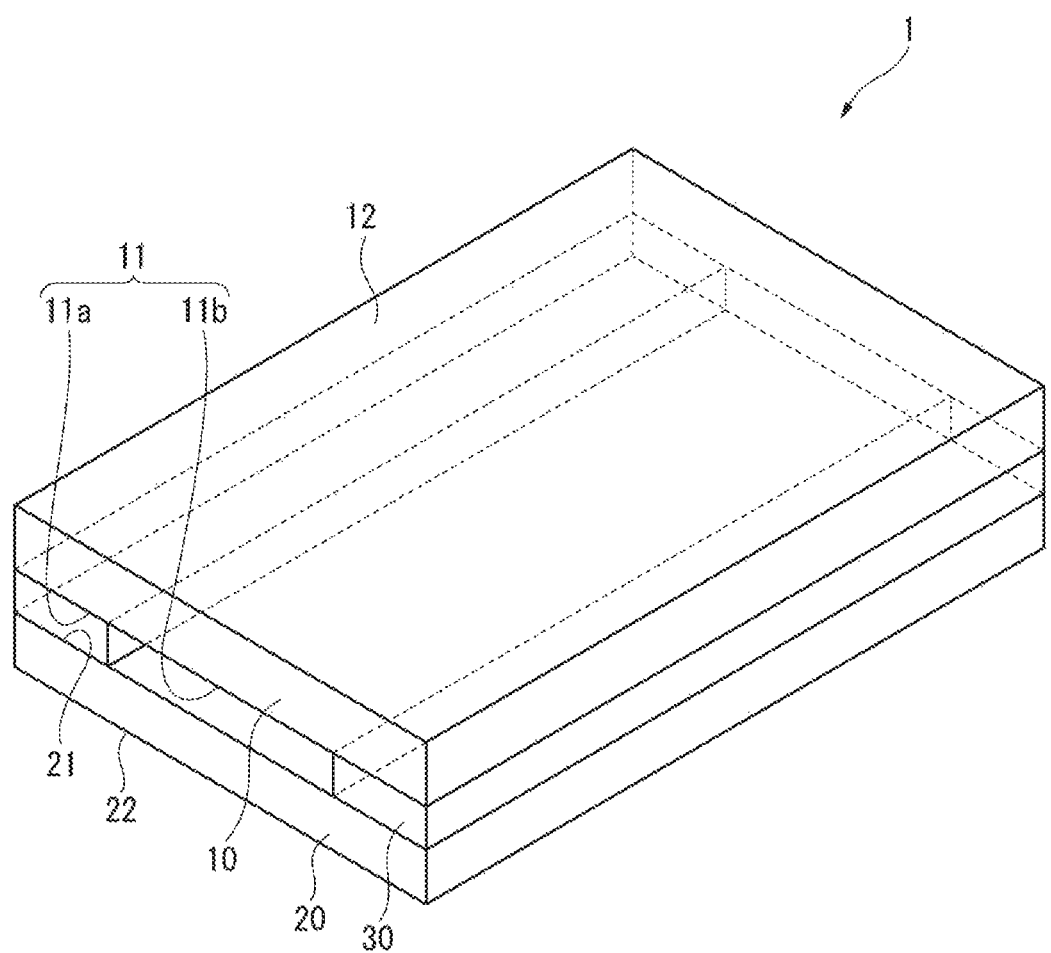
FIG. 2 is a perspective view of the carbon nanotube sheet structure according to the first exemplary embodiment.

FIG. 2 is a perspective view of the carbon nanotube sheet structure 1 according to the first exemplary embodiment.

The carbon nanotube sheet structure 1 includes a carbon nanotube sheet 20, a first base material 10 and a first spacer 30 that provides a gap between the carbon nanotube sheet 20 and the first base material 10. In the carbon nanotube sheet structure 1, the carbon nanotube sheet 20, the first spacer 30 and the first base material 10 are layered in this order.

First Base Material

The first base material 10 is a member of the carbon nanotube sheet structure 1 that supports the carbon nanotube sheet 20. A first spacer 30 is provided between the first base material 10 and the carbon nanotube sheet 20.

The first base material 10 includes a first base material surface 11 facing the carbon nanotube sheet 20 and a second base material surface 12 opposite the first base material surface 11.

The first base material surface 11 includes a first region 11a on which the first spacer 30 is provided and a second region 11b on which the first spacer 30 is not provided. It should be noted that the phrase "the base material is provided with the spacer" not only means that the spacer is in direct contact with the surface of the base material but also that an adhesive layer is provided between the surface of the base material and the spacer in order to enhance adhesion therebetween and that a release agent layer is provided between the surface of the base material and the spacer in order to enhance releasability therebetween.

In order to enhance adhesion between the first base material 10 and the first spacer 30 at least in the first region 11a, the first base material surface 11 is preferably subjected to at least one surface treatments including a primer treatment, a corona treatment and a plasma treatment.

In addition, the first base material surface 11 may be coated with an adhesive (tackiness-applying treatment) at least in the first region 11a. Examples of the adhesive used for the tackiness-applying treatment for the first base material 10 and other base materials are acrylic adhesives, rubber adhesives, silicone adhesives and urethane adhesives.

The thickness of the first base material 10 is preferably in a range from 10 µm to 500 µm, more preferably in a range from 15 µm to 300 µm, and further preferably in a range from 20 µm to 250 µm. The first base material 10 is not necessarily sheet-shaped but may be in a form of an elongated component.

The first base material 10 may be, for instance, provided using a sheet material. Examples of a material for the sheet material include a synthetic resin film. Examples of the synthetic resin film include a polyethylene film, a polypropylene film, a polybutene film, a polybutadiene film, a polymethylpentene film, a polyvinyl chloride film, a vinyl chloride copolymer film, a polyethylene terephthalate film, a polyethylene naphthalate film, a polybutylene terephthalate film, a polyurethane film, an ethylene-vinyl acetate copolymer film, an ionomer resin film, an ethylene.(meth) acrylate copolymer film, an ethylene.(meth)acrylate ester copolymer film, a polystyrene film, a polycarbonate film, a polyimide film, and a fluorine resin film. In addition to the above, the first base material 10 may be a cross-linked film and laminated film of the above films.

In the first base material 10, the second base material surface 12 opposite the first base material surface 11 is preferably releasable. With the second base material surface 12 being releasable, the carbon nanotube sheet 20 can be easily peeled off from the second base material surface 12 when the carbon nanotube sheet structure 1 is taken out from a laminate formed by laminating the carbon nanotube sheet structures 1.

The method for applying releasability to the second base material surface 12 of the first base material 10 is not limited. For instance, the second base material surface 12 of the first base material 10 preferably includes a release agent layer. The release agent layer is formed by, for instance, coating a release agent on the second base material surface 12. The release agent is, for instance, a release agent including at least one resin selected from the group consisting of an olefin resin, a rubber elastomer, a long-chain alkyl resin, an alkyd resin, a fluorine resin and a silicone resin. Examples of the rubber elastomer include a butadiene resin and an isoprene resin. Among the above release agents, a release agent containing a fluorine resin is preferable in terms of enhancement in the releasability of the carbon nanotube sheet 20.

The thickness of the release agent layer is not especially limited. When the release agent layer is formed by coating a solution containing the release agent, the thickness of the release agent layer is preferably in a range from 0.01 µm to 2.0 µm, more preferably in a range from 0.03 µm to 1.0 µm.

In the first base material 10, the surface roughness $Ra_1$ of the second base material surface 12 opposite the first base material surface 11 is preferably 0.05 µm or more. With the surface roughness $Ra_1$ of the second base material surface 12 being 0.05 µm or more, the carbon nanotube sheet 20 that has been in contact with the second base material surface 12 of the first base material 10 can be easily peeled off without being torn when the carbon nanotube sheet structure 1 is taken out from the laminate. The surface roughness $Ra_1$ of the second base material surface 12 is preferably 0.1 µm or more, more preferably 0.15 µm or more. It should be noted that the surface roughness herein refers to an arithmetic average roughness, which is measured using a stylus surface roughness gauge in accordance with JIS B 0633:2001. The surface roughness $Ra_1$ of the second base material surface 12 is preferably 10 µm or less. When the surface roughness $Ra_1$ of the second base material surface 12 if 10 µm or less, the flatness of the second base material surface 12 is kept at an appropriate level. Accordingly, the occurrence of defects (e.g. tear of the carbon nanotube sheet 20) resulted from irregularities on the second base material surface 12 can be restrained. The surface roughness $Ra_1$ of the second base material surface 12 is more preferably 5 µm or less, further more preferably 3 µm or less.

In order to set the surface roughness $Ra_1$ of the second base material surface 12 within the above range, for instance, the following methods are applicable: blending particulate matters in the material of the first base material 10 (e.g. resin); when the material of the first base material 10 (e.g. resin) is melted to be molded, injecting the molten material onto a roller or the like with uneven surface to form irregularities on the second base material surface 12; providing irregularities on the second base material surface 12 using a physical molding process; and mixing materials with low compatibility and forming a cover film by coating and drying the mixed materials, so that a discontinuous structure of the other one of the materials is formed in a continuous structure of one of the materials to provide the irregularities on the second base material surface 12. Examples of the above particulate matters are inorganic fillers such as a silica filler, and an organic filler such as a polymethylmethacrylate filler. Examples of the physical molding process are sand blasting and grinding.

In order to easily peel off the first base material 10 and the first spacer 30 from a laminate provided by laminating the carbon nanotube sheet structure 1 (first carbon nanotube sheet structure) and another carbon nanotube sheet structure 1 (second carbon nanotube sheet structure), a tackiness-applying treatment may be applied to a predetermined part of the second base material surface 12 of the second carbon nanotube sheet structure. The predetermined part of the second base material surface 12 is a part overlapping with the first spacer 30 of the first carbon nanotube sheet structure overlapped on the second base material surface 12 of the second carbon nanotube sheet structure in a plan view of the laminate. With the above arrangement, the carbon nanotube sheet 20 of the first carbon nanotube sheet structure is adhered to the first base material 10 of the second carbon nanotube sheet structure at a part applied with the tackiness-applying treatment, so that the first base material 10 and the first spacer 30 of the first carbon nanotube sheet structure can be easily peeled off from the carbon nanotube sheet 20.

Figure 3A:
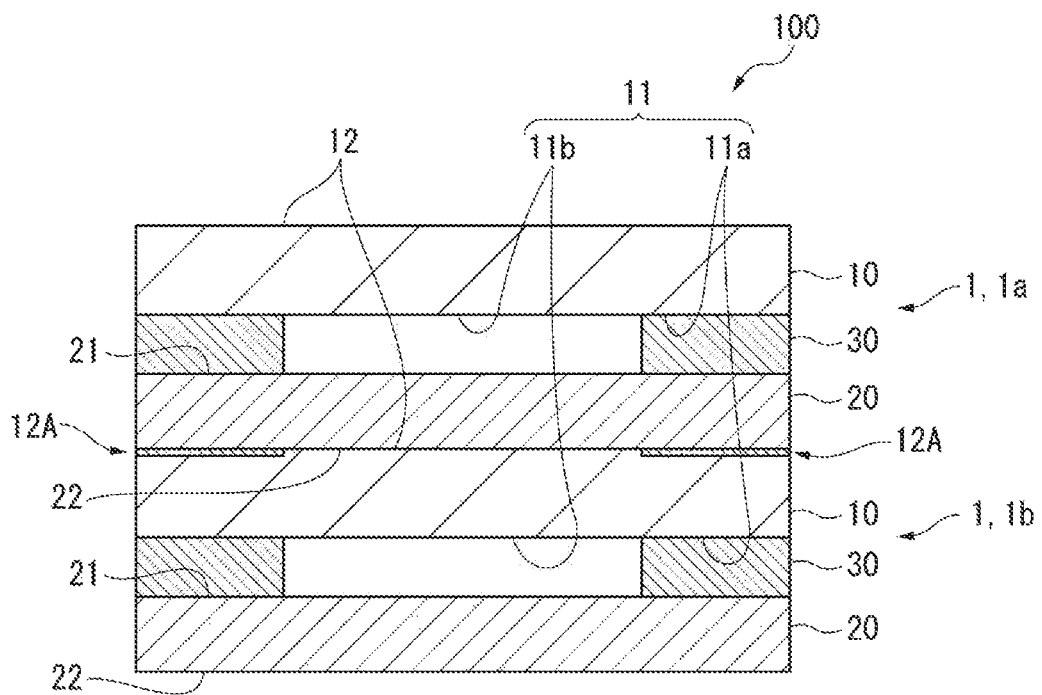
FIG. 3A is a cross section of a laminate according to the first exemplary embodiment.

As an example, a laminate 100 provided by layering two carbon nanotube sheet structures 1 is shown in FIG. 3A. In the laminate 100, one of the carbon nanotube sheet structures is referred to as a first carbon nanotube sheet structure 1a and the other one of the carbon nanotube sheet structures is referred to as a second carbon nanotube sheet structure 1b. In the laminate 100, the second base material surface 12 of the second carbon nanotube sheet structure 1b is provided with a tackiness-applied portion 12A at which the tackiness-applying treatment is applied. The position of the tackiness-applied portion 12A of the second carbon nanotube sheet structure 1b overlaps the position of the first spacer 30 of the first carbon nanotube sheet structure 1*a* in a plan view of the laminate 100. In the laminate 100, the carbon nanotube sheet 20 of the first carbon nanotube sheet structure 1*a* is adhered to the second carbon nanotube sheet structure 1*b* at the tackiness-applied portion 12A on the second base material surface 12, so that the first base material 10 and the first spacer 30 of the first carbon nanotube sheet structure 1*a* can be easily peeled off from the carbon nanotube sheet 20 of the first carbon nanotube sheet structure 1*a*.

Carbon Nanotube Sheet

The carbon nanotube sheet 20 includes a first sheet surface 21 on which the first spacer 30 is formed, and a second sheet surface 22 opposite the first sheet surface 21. In the carbon nanotube sheet structure 1, no other component is provided on the second sheet surface 22 and the carbon nanotube sheet 20 is exposed. It should be noted that the phrase "the spacer is provided on the sheet surface of the carbon nanotube sheet" herein not only means that the spacer is in direct contact with the sheet surface but also that an adhesive layer is provided between the sheet surface and the spacer in order to enhance adhesion therebetween and that a release agent layer is provided between the sheet surface and the spacer in order to enhance releasability therebetween.

The carbon nanotube sheet 20 is structured of a plurality of carbon nanotubes preferentially arrayed in one direction in the sheet surface.

Herein, the phrase "carbon nanotubes arrayed in one direction in the sheet surface" refers to a state in which the carbon nanotubes are arrayed along the one direction in the sheet surface (e.g. a major axis of the carbon nanotube is arrayed to be parallel to the one direction in the sheet surface).

Further, the term "preferentially arrayed" herein refers to a state that the arrayed nanotubes accounts for a major part of the nanotubes. For instance, when the major axes of the carbon nanotubes are arrayed in parallel to the one direction in the sheet surface, as long as the arrayed nanotubes account for a major part of the nanotubes, the major axes of a part of the carbon nanotubes are not necessarily arrayed in parallel to the one direction in the sheet surface.

The carbon nanotube sheet 20 is obtainable by, for instance, drawing carbon nanotubes agglomerated by virtue of the intermolecular force from a forest of the carbon nanotubes in a form of a sheet and separating the sheet of carbon nanotubes from a substrate. Herein, the term "carbon nanotube forest" means a grown form of a plurality of carbon nanotubes grown on a substrate so that the carbon nanotubes are oriented in a vertical direction with respect to the substrate, which is sometimes referred to as an "array."

The carbon nanotube sheet 20 may have a structure of a fibriform assembly of carbon nanotubes. With the structure of the fibriform assembly of carbon nanotubes, the area occupied by the carbon nanotubes per a unit area is decreased, so that, for instance, a light transmittance of the carbon nanotube sheet 20 can be improved.

When the carbon nanotube sheet 20 is drawn from the forest of carbon nanotubes to be produced, carbon nanotubes arrayed in one direction in the sheet surface are evenly contained in the carbon nanotube sheet 20. As described later, when the carbon nanotube sheet is exposed to steam and the like in a free-standing condition, the carbon nanotubes evenly contained in the carbon nanotube sheet locally forms minute bundles to form the structure of the fibriform assembly of the carbon nanotubes.

An average diameter of the structure of the fibriform assembly of the carbon nanotubes (an average of diameters of a plurality of the fibriform assembly) is preferably in a range from 1 μm to 300 μm, more preferably 3 μm to 150 μm, further more preferably 5 μm to 50 μm.

It should be noted that the average diameter of the structure of the fibriform assembly of the carbon nanotubes herein refers to an average diameter of outer circumferences of the structure of the fibriform assembly.

The carbon nanotube sheet 20 may be subjected to a densification treatment.

Herein, the "densification treatment" refers to a treatment for bundling the carbon nanotube sheet 20 or increasing density (concentration) of the carbon nanotubes in a thickness direction of the carbon nanotube sheet 20. The "bundling" herein refers to forming bundle(s) of adjacent plurality of carbon nanotubes in the carbon nanotube sheet 20.

When the carbon nanotube sheet 20 is subjected to the bundling treatment, the structure of a fibriform assembly of carbon nanotubes can be formed.

Examples of the densification treatment include a bundling by exposing a free-standing carbon nanotube sheet 20 to a vapor of a substance which is liquid at an ambient temperature, and a bundling by exposing a free-standing carbon nanotube sheet 20 to particles (aerosol) of a substance which is liquid at an ambient temperature. Examples of the substances, which is liquid at an ambient temperature and usable for the densification treatment, include water, alcohols, ketones, and esters. Examples of the alcohols include ethanol, methanol, and isopropylalcohol. Examples of the ketones include acetone, and methyl ethyl ketone. Examples of the esters include ethyl acetate.

When the densification treatment is applied using particles of the substance which is liquid at an ambient temperature, the particle diameter of the substance which is liquid at an ambient temperature is preferably in a range from 5 nm to 200 μm, more preferably in a range from 7.5 nm to 100 μm, and further preferably in a range from 10 nm to 50 μm.

The densification treatment may be applied by, after the carbon nanotube sheet 20 is produced, placing the produced carbon nanotube sheet 20 on a substrate (e.g. a resin film) and immersing the carbon nanotube sheet 20 in a liquid. In this arrangement, the carbon nanotubes contained in the carbon nanotube sheet 20 gather in a direction of the substrate to cause densification in the thickness direction of the carbon nanotube sheet 20.

The carbon nanotube sheet 20 may be a laminate of a plurality of carbon nanotube sheets. The carbon nanotube sheet 20 in a form of a laminate exhibits a low sheet resistance. In this case, the carbon nanotube sheet 20 may be a laminate of a plurality of carbon nanotube sheets having been subjected to the densification treatment, or, alternatively, may be a laminate of a plurality of carbon nanotube sheets produced by drawing carbon nanotubes from a forest, which is subsequently subjected to a densification treatment. Further, the laminate of the plurality of carbon nanotube sheets 20 having been subjected to a densification treatment may further be subjected to additional densification treatment.

The thickness of the carbon nanotube sheet 20 is determined depending on the usage of the carbon nanotube sheet 20 (e.g. whether or not the sheet resistance is to be kept low and whether or not the light transmittance has to be secured). As an example, the thickness of the carbon nanotube sheet 20 is preferably in a range from 0.01 μm to 100 μm, more preferably in a range from 0.05 μm to 75 μm.

The carbon nanotube sheet 20 may be in a form of an elongated component as in the first base material 10. FIG. 4 shows a carbon nanotube sheet structure 1e including the carbon nanotube sheet 20 in a form of an elongated component and the first base material 10 in a form of the elongated component. When the carbon nanotube sheet 20 is an elongated component, the first base material 10 is also preferably an elongated component.

Figure 5:
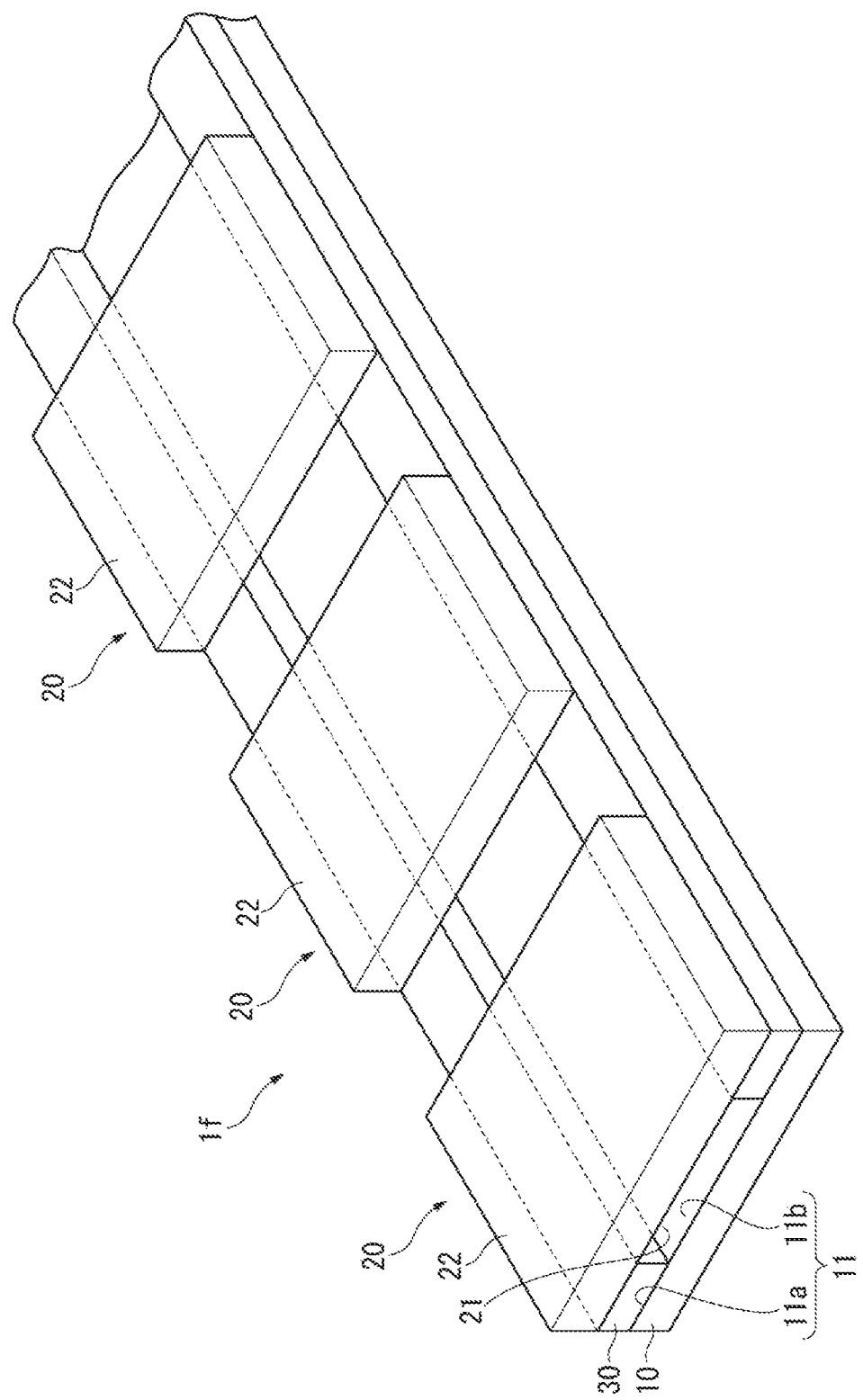
FIG. 5 is a perspective view of a carbon nanotube sheet structure according to another modification of the first exemplary embodiment.

In contrast, when the first base material 10 is an elongated component, the carbon nanotube sheet 20 may be a sheet-shaped component and disposed on the base material at intervals, or may be an elongated component. FIG. 5 shows a carbon nanotube sheet structure 1f including the elongated first base material 10 and a plurality of sheet-shaped carbon nanotube sheets 20 disposed on the elongated first base material 10 through the first spacers 30.

It should be noted that the term "elongated" herein means that, when a carbon nanotube structure and the like are seen in a plan view, one of the vertical and horizontal lengths if 10 or more times, preferably 30 or more times as long as the other of the vertical and horizontal lengths.

First Spacer

The first spacer 30 is disposed between the carbon nanotube sheet 20 and the first base material 10. The first spacer 30 provides a gap between the carbon nanotube sheet 20 and the first base material 10 to provide on the carbon nanotube sheet structure 1a portion at which the carbon nanotube sheet 20 and the first base material 10 are not in contact with each other. The first spacer 30 is provided in the first region 11a on the first base material surface 11. The first spacer 30 is not provided in the second region 11b on the first base material surface 11.

The shape and position of the first spacer 30 are not limited as long as the first spacer 30 is configured to provide a gap between the carbon nanotube sheet 20 and the first base material 10 to define on the carbon nanotube sheet structure 1a portion at which the carbon nanotube sheet 20 and the first base material 10 are not in contact with each other. The shape and position of the first spacer 30 is preferably designed as needed so that, for instance, the region at which the carbon nanotube sheet 20 is not in contact with the first base material 10 and the first spacer 30 can be widened as possible. The shape of the first spacer 30 may be in any shape including rectangular parallelepiped, a cube, a cylinder, a square column and a sphere. The first spacer 30 may be an elongated component.

When the carbon nanotube sheet 20 is a sheet-shaped component, the first spacer 30 may define a frame extending continuously or discontinuously along an outer edge of the sheet surface of the carbon nanotube sheet 20.

Figure 6:
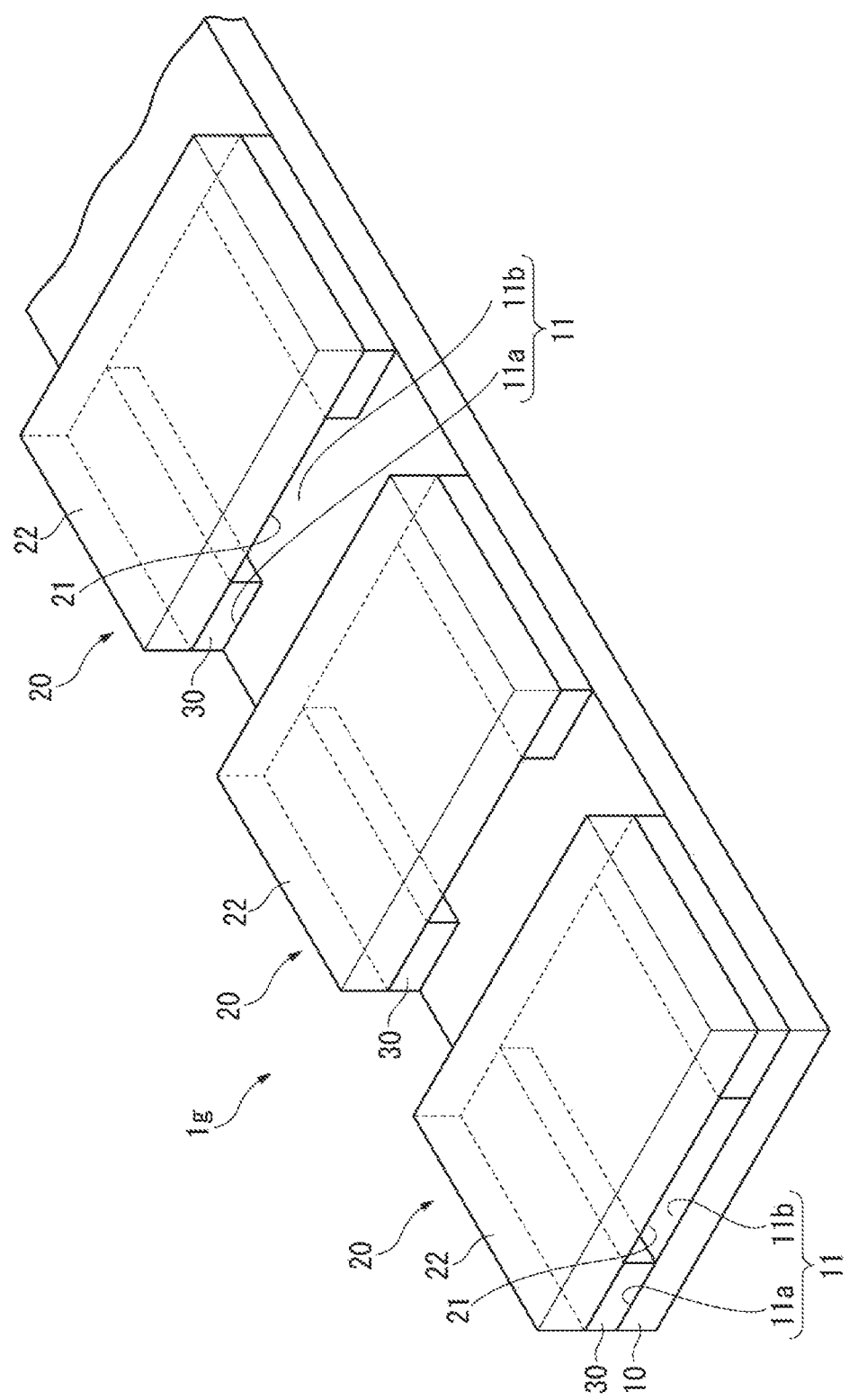
FIG. 6 is a perspective view of a carbon nanotube sheet structure according to still another modification of the first exemplary embodiment.

FIG. 6 shows a carbon nanotube sheet structure 1g. The carbon nanotube sheet structure 1g includes a carbon nanotube sheet 20 in a form of a sheet-shaped component, an elongated first base material 10 and a first spacer 30 interposed between the carbon nanotube sheet 20 and the first base material 10. In the carbon nanotube sheet structure 1g, the first spacer 30 is discontinuously provided along the longitudinal direction of the first base material 10.

When the carbon nanotube sheet 20 is an elongated component, the first base material 10 may also be an elongated component and the first spacer 30 may extend continuously or discontinuously along the outer edge of the elongated profile of the carbon nanotube sheet 20 and in the longitudinal direction.

In the carbon nanotube sheet structure 1e shown in FIG. 4, the first spacer 30 is provided between the elongated carbon nanotube sheet 20 and the elongated first base material 10 along the outer edge of the elongated profile of the carbon nanotube sheet 20. The first spacer 30 is continuously provided in the longitudinal direction.

It should be noted that, in the later-described second to fifth exemplary embodiments and modifications thereof, not only the first base material but also the base material(s) other than the first base material may have an elongated profile, and not only the first spacer but also the spacer(s) other than the first spacer may be continuously or discontinuously formed along the outer edge of the profile of the carbon nanotube sheet and in the longitudinal direction.

Examples of the material of the first spacer 30 include a synthetic resin film. Examples of the synthetic resin film usable for the first spacer 30 are the same as those for the first base material 10.

The first spacer 30 may be integrated with the first base material 10. For instance, the first spacer 30 may be formed by grinding a flat synthetic resin film using sand blasting, etching and the like. Specifically, the synthetic resin film is ground at a position corresponding to the position of the second region 11b of the synthetic resin film using sand blasting, etching and the like to provide a portion projected from the film, which is usable as the first spacer 30.

The first spacer 30 may be a component independent of the first base material 10, where the first base material 10 and the first spacer 30 may be integrated when the carbon nanotube sheet structure 1 is formed. In this case, for instance, a film component having the profile of the first spacer 30 may be attached to the first base material surface 11 of the first base material 10 to provide the first base material 10 integrated with the first spacer 30. Alternatively, the first spacer 30 may be formed at the first region 11a of the first base material surface 11 on a synthetic resin film for the first base material 10 using a 3D printer and the like.

A tackiness-applying treatment may be applied on the surface of the first spacer 30 in contact with the carbon nanotube sheet 20. With such an arrangement, the carbon nanotube sheet 20 in contact with the first spacer 30 is not easily peeled off from the first spacer 30 when the carbon nanotube sheet structure 1 is taken out from the laminate provided by laminating the carbon nanotube sheet structures 1. Accordingly, the carbon nanotube sheet 20 having been in contact with the second base material surface 12 of the first base material 10 can be easily peeled off without being torn. The tackiness-applying treatment may be applied using the same process as the process applied for the first base material surface 11. Alternatively, the tackiness-applying treatment may be applied by using a self-sticky material in forming the first spacer 30 itself. Examples of the self-sticky material include silicone gel and urethane gel.

Figure 3B:
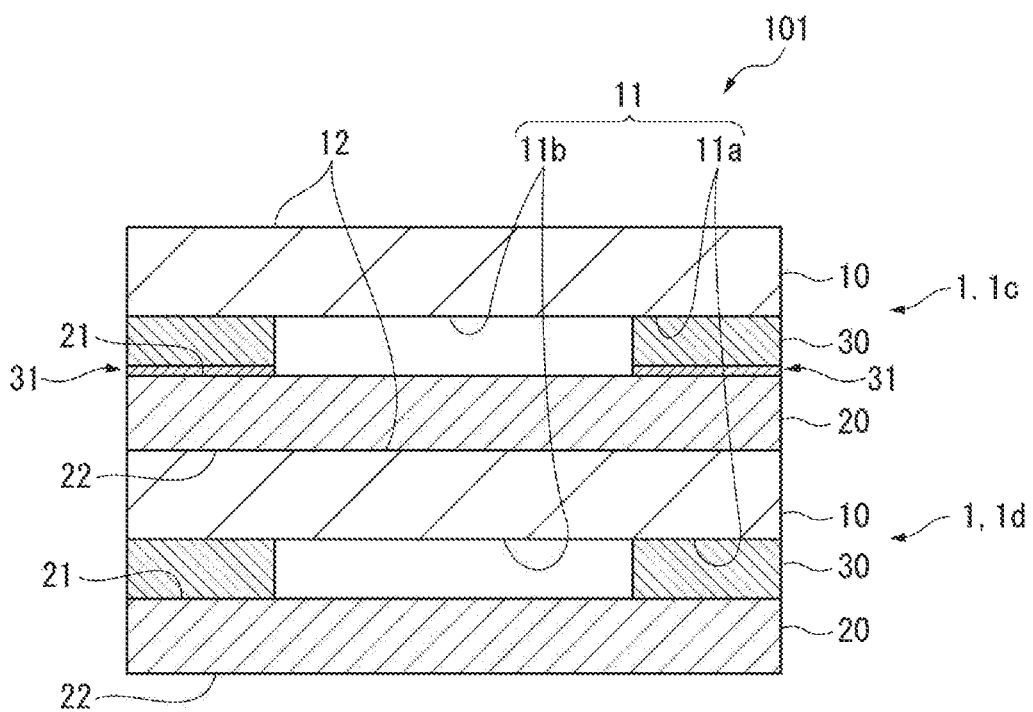
FIG. 3B is a cross section of a laminate according to the first exemplary embodiment.

FIG. 3B shows a laminate 101 provided by layering two carbon nanotube sheet structures 1. In the laminate 101, one of the carbon nanotube sheet structures is referred to as a first carbon nanotube sheet structure 1c and the other one of the carbon nanotube sheet structures is referred to as a second carbon nanotube sheet structure 1d. In the laminate 101, the surface of the first spacer 30 in contact with the carbon nanotube sheet 20 of the carbon nanotube sheet structure 1c is provided with a tackiness-applied portion 31 subjected to the tackiness-applying treatment. In the laminate 101, the carbon nanotube sheet 20 of the first carbon nanotube sheet structure 1c is not easily peeled off from the first spacer 30. Accordingly, the carbon nanotube sheet 20 of the first carbon nanotube sheet structure 1c, which has been in contact with the second base material surface 12 of the first base material 10 of the second carbon nanotube sheet structure 1d, can be easily peeled off without being torn.

Method for Production of Carbon Nanotube Sheet Structure and Laminate

The method for production of the carbon nanotube sheet structure 1 is not specifically limited.

For instance, the carbon nanotube sheet structure 1 is produced according to the following steps.

Initially, a forest of the carbon nanotubes is formed on a substrate (e.g. a silicon wafer) according to a known process. Next, an end of the formed forest is twisted and is drawn away from the substrate using tweezers or the like to produce a carbon nanotube sheet.

Further, the first base material 10 provided with the first spacer 30 is produced. The first base material 10 may be integrated with the first spacer 30. Alternatively, the first base material 10 may be a component independent of the first spacer 30, or may be provided by integrating the first base material 10 and the first spacer 30 produced as separate components.

While the first base material surface 11 (a surface provided with the first spacer 30) of the first base material 10 is opposed to one of the faces of the produced carbon nanotube sheet, the carbon nanotube sheet is attached to the first spacer 30 to provide the carbon nanotube sheet structure 1.

The laminate can be obtained by layering the thus produced carbon nanotube sheet structures 1. At this time, the carbon nanotube sheet structures 1 are layered so that the carbon nanotube sheet 20 is in contact with the second base material surface 12 opposite the first base material surface 11 of the first base material 10.

Figure 7:
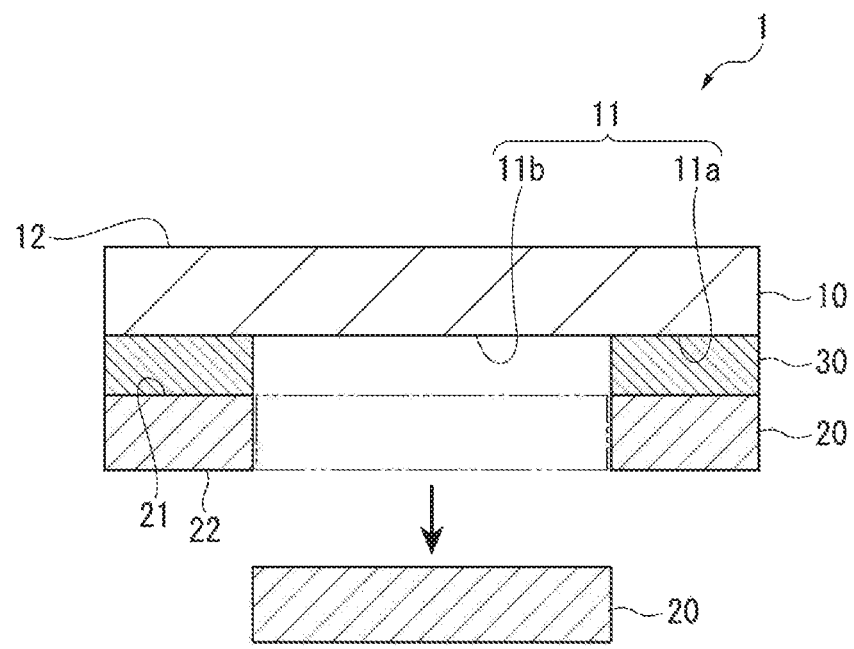
FIG. 7 is another cross section of the carbon nanotube sheet structure according to the first exemplary embodiment.

According to the carbon nanotube sheet structure 1 of the first exemplary embodiment, the carbon nanotube sheet 20 can be held in the carbon nanotube sheet structure 1 while keeping a part of the carbon nanotube sheet 20 in a free-standing condition. When in use, the free-standing carbon nanotube sheet 20 can be taken out without tearing the carbon nanotube sheet 20 at an undesired portion. In order to take out the carbon nanotube sheet 20 kept in a free-standing condition, it is only necessary that the carbon nanotube sheet 20 spaced apart from the first base material 10 is cut at any position between the portion to be taken out and a border between the first spacer 30 and the carbon nanotube sheet 20 in contact with the first spacer 30. For instance, the carbon nanotube sheet 20 may be cut at positions inside the portion for the carbon nanotube sheet 20 to be in contact with the first spacer 30 as shown in FIG. 7, thereby taking out the free-standing carbon nanotube sheet 20. In other words, it is only necessary to take out a part of the carbon nanotube sheet 20 spaced apart from the first base material 10 (i.e. at a portion other than the contact portion between the carbon nanotube sheet 20 and the first spacer 30).

The carbon nanotube sheet structure 1 according to the first exemplary embodiment can be placed while being stacked.

According to the carbon nanotube sheet structure 1 of the first exemplary embodiment, the region of the carbon nanotube sheet 20 opposed to the second region 11b of the first base material surface 11 is kept from being in contact with the first base material 10 and the first spacer 30 (i.e. the free-standing condition). Further, the carbon nanotube sheet structure 1 has a sheet-shaped overall configuration. Accordingly, the sheet-shaped carbon nanotube sheet structure 1 can be stored and transported while being stacked. Further, the carbon nanotube sheet structure 1 in a form of an elongated component can be wound in a roll for storage and transportation. In the carbon nanotube sheet structure 1 in a form of an elongated component, it is preferable that the second region 11b of the first base material surface 11 is continuous in the longitudinal direction of the carbon nanotube sheet structure 1. With the carbon nanotube sheet structure 1 of the first exemplary embodiment being placed while being stacked, the carbon nanotube sheet 20 is kept from being torn when the carbon nanotube sheet 20 is peeled off from the second base material surface 12 opposite the first base material surface 11 as in a later-described second exemplary embodiment. In addition, it is less likely that the carbon nanotube sheet 20 is pressed in a laminate.

Second Exemplary Embodiment

A carbon nanotube sheet structure according to a second exemplary embodiment will be described below.

In the description of the second exemplary embodiment, the same reference sign and/or name will be attached to the same components as those in the first exemplary embodiment to omit or simplify the description. Further, the feature(s) (including specific example(s)) not explicitly mentioned in the second exemplary embodiment may be the same as that in the first exemplary embodiment.

Figure 8:
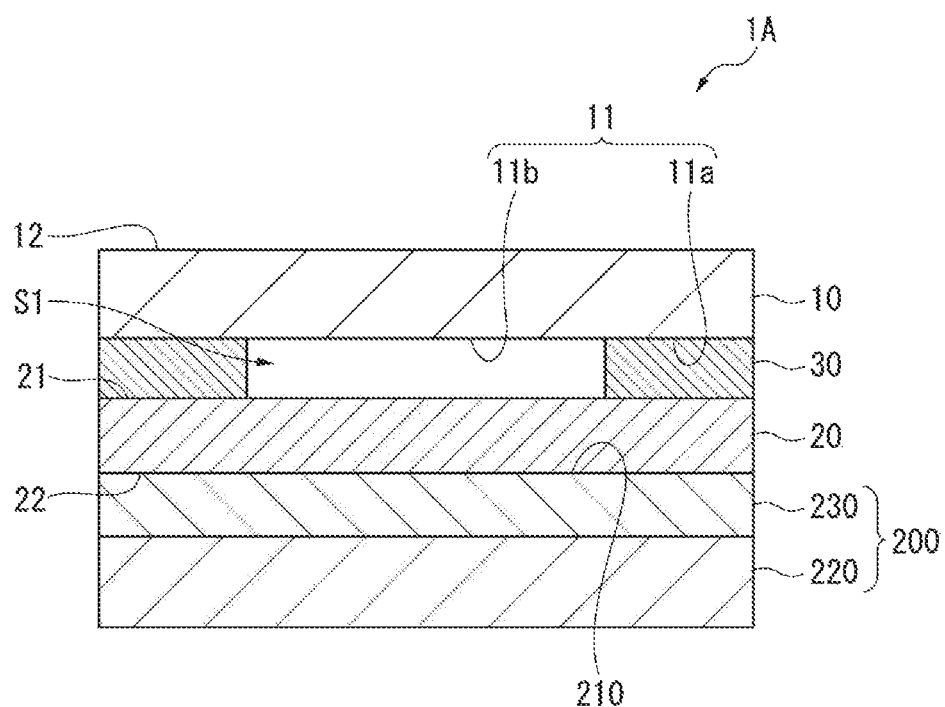
FIG. 8 is a cross section of a carbon nanotube sheet structure according to a second exemplary embodiment.

FIG. 8 is a cross section of a carbon nanotube sheet structure 1A according to the second exemplary embodiment.

The carbon nanotube sheet structure 1A according to the second exemplary embodiment differs from the carbon nanotube sheet structure 1 according to the first exemplary embodiment in that the carbon nanotube sheet structure 1A further includes a second base material 200. In the second exemplary embodiment, the carbon nanotube sheet 20, the first base material 10, and the first spacer 30 are the same as those in the first exemplary embodiment.

The carbon nanotube sheet structure 1A includes the carbon nanotube sheet 20, the first base material 10, the first spacer 30 and the second base material 200. In the carbon nanotube sheet structure 1A, the second base material 200, the carbon nanotube sheet 20, the first spacer 30 and the first base material 10 are layered in this order.

Second Base Material

The second base material 200 includes a third base material surface 210. The third base material surface 210 and the second sheet surface 22 of the carbon nanotube sheet 20 face with each other. The second sheet surface 22 is a surface opposite the first sheet surface 21 in contact with the first spacer 30.

In the second exemplary embodiment, the carbon nanotube sheet 20 is provided on the second base material 200. In the carbon nanotube sheet structure 1A, the second sheet surface 22 is covered with the second base material 200 to be protected. It should be noted that the phrase "the carbon nanotube sheet is provided on the other component" herein not only means that the carbon nanotube sheet is in direct contact with the surface of the other component but also that an adhesive layer is provided between the surface of the other component and the carbon nanotube sheet in order to enhance adhesion therebetween and that a release agent layer is provided between the surface of the other component and the carbon nanotube sheet in order to enhance releasability therebetween.

It is preferable that the third base material surface 210 exhibits releasability. When the third base material surface 210 exhibits releasability, the second base material 200 can be easily peeled off from the carbon nanotube sheet structure 1A. The method for applying releasability to the third base material surface 210 is not especially limited.

Further, in the second exemplary embodiment, the second base material 200 may include a releasable base material 220, and a release agent layer 230 formed on a surface of the releasable base material 220. The surface of the release agent layer 230 corresponds to the third base material surface 210. The release agent layer 230 may be formed only on one surface of the releasable base material 220 or may be formed on both surfaces of the releasable base material 220.

Examples of the releasable base material 220 include a paper base material, a laminated paper and a plastic film. Examples of the paper base material include glassine paper, coated paper, and cast-coated paper. Examples of the laminated paper include a base material in which a thermoplastic resin such as polyethylene is laminated on the above-mentioned paper base material. Examples of the plastic film include polyester films such as films of polyethylene terephthalate, polybutylene terephthalate and polyethylene naphthalate, and polyolefin film such as films of polypropylene and polyethylene. When the plastic film is used as the releasable base material 220, the thickness of the plastic film is preferably in a range from 10 μm to 500 μm, more preferably in a range from 15 μm to 300 μm, and further preferably in a range from 20 μm to 200 μm.

It is preferable that the release agent layer 230 contains, for instance, the release agent mentioned in the first exemplary embodiment. The release agent is preferably a release agent including at least one resin selected from the group consisting of an olefin resin, a rubber elastomer, a long-chain alkyl resin, an alkyd resin, a fluorine resin and a silicone resin. The release agent layer 230 is formed by applying the release agent on the releasable base material 220.

The thickness of the release agent layer 230 is not especially limited. When the release agent layer 230 is formed by applying a solution containing the release agent, the thickness of the release agent layer 230 is preferably in a range from 0.01 μm to 2.0 μm, more preferably in a range from 0.03 μm to 1.0 μm.

A tackiness-applying treatment may be applied on a part of the third base material surface 210 overlapping the first spacer 30 in a plan view of the carbon nanotube sheet structure. With the above arrangement, since the second base material 200 and the carbon nanotube sheet 20 are bonded, the first base material 10 and the first spacer 30 can be easily peeled off from the carbon nanotube sheet 20.

In addition, it is preferable that a tackiness-applied portion provided by applying a tackiness-applying treatment is provided to part of the third base material surface 210 overlapping the first spacer 30 in a plan view of the carbon nanotube sheet structure, and a remainder part of the third base material surface 210 other than the tackiness-applied portion is provided with a part with releasability (releasable part). With the above arrangement, since the carbon nanotube sheet 20 and the third base material surface 210 are adhered at the tackiness-applied portion, the first base material 10 and the first spacer 30 can be easily peeled off from the carbon nanotube sheet 20 in the carbon nanotube sheet structure 1A, and the carbon nanotube sheet 20 can be easily peeled off from the part with releasability (releasable part) of the third base material surface 210 other than the tackiness-applied portion on the third base material surface 210.

The thickness of the second base material 200 is not especially limited. The thickness of the second base material 200 is preferably in a range from 10 μm to 500 μm, more preferably in a range from 15 μm to 300 μm, and further preferably in a range from 20 μm to 200 μm.

The carbon nanotube sheet structure 1A of the second exemplary embodiment offers the same advantages as those in the carbon nanotube sheet structure 1 of the first exemplary embodiment except that the carbon nanotube sheet 20 can be held in the carbon nanotube sheet structure 1 while keeping a part of the carbon nanotube sheet 20 in a free-standing condition.

Further, according to the carbon nanotube sheet structure 1A of the second exemplary embodiment, since the second sheet surface 22 of the carbon nanotube sheet 20 is supported by the second base material 200, handleability of the carbon nanotube sheet structure 1A can be improved as compared with the first exemplary embodiment. Further, since the second sheet surface 22 of the carbon nanotube sheet 20 is covered with the second base material 200, the protection effect for the carbon nanotube sheet 20 can be improved as compared with the first exemplary embodiment.

Further, according to the carbon nanotube sheet structure 1A of the second exemplary embodiment, one of the surfaces of the carbon nanotube sheet 20 is in contact with the first spacer 30 or the second base material 200 and thus the carbon nanotube sheet 20 is not in the free-standing condition. However, the carbon nanotube sheet 20 includes a region S1 on the first sheet surface 21 at which the carbon nanotube sheet 20 is not in contact with the first spacer 30 but is exposed. It should be noted that, when the second base material 200 is first peeled off from the carbon nanotube sheet structure 1A, a free-standing part can be provided to the carbon nanotube sheet 20.

The arrangement of the carbon nanotube sheet structure 1A provides the following advantages as compared with the arrangement disclosed in the above Patent Literature 1 where a carbon nanotube sheet is stored or transported while the carbon nanotube sheet is held between two protection films.

Initially, in the structure in which the carbon nanotube sheet is held between the two protection films, one of the protection films is peeled off and then the other one of the protection films is peeled off in order to separate the carbon nanotube sheet from the protection films. In this case, unless the protection films are different in releasability from the carbon nanotube sheet, the carbon nanotube sheet sometimes remains adhered on the later-peeled one of the protection films and the carbon nanotube sheet may be torn. On the other hand, even when the protection films differ in releasability with respect to the carbon nanotube sheet, since the releasability of later-peeled one of the protection films is low relative to the former-peeled one of the protection films, the later-peeled one of the protection films may be sometimes difficult to be peeled off from the carbon nanotube sheet.

In contrast, since the carbon nanotube sheet structure 1A of the second exemplary embodiment includes the region S1 on the first side (first sheet surface 21) of the carbon nanotube sheet 20 that is not in contact with the first base material 10 and the first spacer 30, the carbon nanotube sheet is not easily torn at the region S1 when the protection film is peeled off as in Patent Literature 1.

A sheet-shaped article such as the structure in which the carbon nanotube sheet is layered on at least one of the support and the protection material is normally stored after being stacked when the article is a sheet-shaped article, or after being wound when the article is an elongated article. When the article is in a form of the sheet-shaped article, upper ones of the stacked sheets may sometimes compress the lower ones of the stacked sheets. When the article is in a form of the elongated product, a pressure (so-called winding pressure) is applied when the article is wound, so that the sheet at and near the center of the article may sometimes be compressed. Thus, it is likely that a pressure in the thickness direction is applied to the carbon nanotube sheet to change the assembly form of the carbon nanotubes in the carbon nanotube sheet to change the properties of the carbon nanotube sheet.

In contrast, in the carbon nanotube sheet structure 1A according to the second exemplary embodiment, the first sheet surface 21 of the carbon nanotube sheet 20 is not in contact with the second region 11b of the first base material 10 and the presence of the first spacer 30 reduces the possibility of compression of the carbon nanotube sheet 20 in the laminate. Accordingly, alteration of the properties of the carbon nanotube sheet 20 caused by the above-described pressure applied in the thickness direction of the carbon nanotube sheet 20 can be effectively avoided.

Third Exemplary Embodiment

A carbon nanotube sheet structure according to a third exemplary embodiment will be described below.

In the description of the third exemplary embodiment, the same reference sign and/or name will be attached to the same components as those in the above-described exemplary embodiments to omit or simplify the description thereof. Further, the feature(s) (including specific example(s)) not explicitly mentioned in the third exemplary embodiment may be the same as those in the above-described exemplary embodiments.

Figure 9:
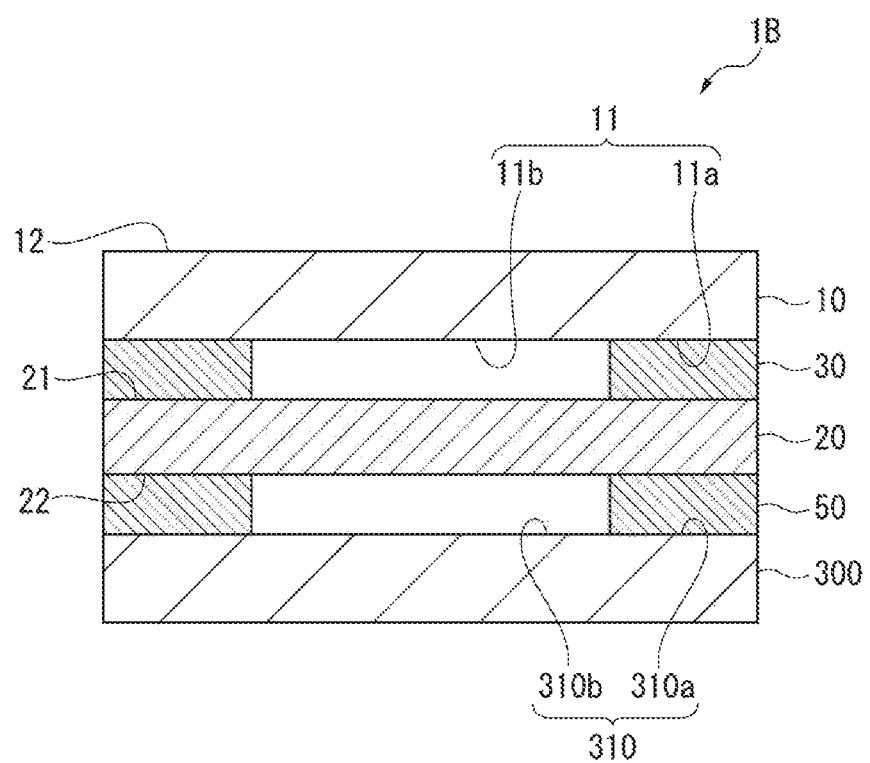
FIG. 9 is a cross section of a carbon nanotube sheet structure according to a third exemplary embodiment.

FIG. 9 is a cross section of a carbon nanotube sheet structure 1B according to the third exemplary embodiment.

The carbon nanotube sheet structure 1B according to the third exemplary embodiment differs from the carbon nanotube sheet structure 1 according to the first exemplary embodiment in that the carbon nanotube sheet structure 1B additionally includes a third base material 300 disposed at a side of the carbon nanotube sheet 20 near the second sheet surface 22 and a second spacer 50 disposed between the third base material 300 and the carbon nanotube sheet 20. In the third exemplary embodiment, the carbon nanotube sheet 20, the first base material 10, and the first spacer 30 are the same as those in the first exemplary embodiment.

The carbon nanotube sheet structure 1B includes the carbon nanotube sheet 20, the first base material 10, the first spacer 30, the third base material 300 and the second spacer 50. In the carbon nanotube sheet structure 1 B, the third base material 300, the second spacer 50, the carbon nanotube sheet 20, the first spacer 30 and the first base material 10 are layered in this order.

(Third Base Material)

The third base material 300 of the carbon nanotube sheet structure 1B is a member supporting the carbon nanotube sheet 20, which is made of the same material as that of the first base material 10 of the first exemplary embodiment.

The third base material 300 includes a fourth base material surface 310. The fourth base material surface 310 and the second sheet surface 22 of the carbon nanotube sheet 20 face with each other. The second sheet surface 22 is a surface opposite the first sheet surface 21 in contact with the first spacer 30.

The fourth base material surface 310 of the third base material 300 of the third exemplary embodiment includes a third region 310a on which the second spacer 50 is provided and a fourth region 310b on which the second spacer 50 is not provided. The third base material 300 is spaced apart from the carbon nanotube sheet 20 at the fourth region 310b of the fourth base material surface 310. The third region 310a may be applied with a surface treatment (e.g. a primer treatment) or a tackiness-applying treatment in the same manner as the first region 11a of the first base material surface 11.

Second Spacer

A second spacer 50 is provided between the third base material 300 and the carbon nanotube sheet 20.

The second spacer 50 of the carbon nanotube sheet structure 1B is a component for providing a gap between the carbon nanotube sheet 20 and the third base material 300. The second spacer 50 is the same as the first spacer 30 in the first exemplary embodiment.

The position of the first spacer 30 disposed between the first base material 10 and the carbon nanotube sheet 20 and the position of the second spacer 50 disposed between the third base material 300 and the carbon nanotube sheet 20 are aligned in a cross section of the carbon nanotube sheet structure 1B in the thickness direction. Herein, the phrase "positions of the spacers are aligned" means not only that the positions of the first spacer 30 and the second spacer 50 are exactly aligned, but also that the positions of the first spacer 30 and the second spacer 50 are at least partially aligned. It should be noted that it is only necessary that the spacers are aligned so that the carbon nanotube sheet 20 is restrained from being deformed or damaged when being pressed by the spacer(s). It is preferable that the spacers are aligned so that the positions of the spacer(s) are matched in the cross section of the carbon nanotube sheet structure.

The surface of the second spacer 50 in contact with the carbon nanotube sheet 20 may be subjected to the tackiness-applying treatment in the same manner as the first spacer 30. In this case, it is preferable that only one of the respective surfaces of the first spacer 30 and the second spacer 50 in contact with the carbon nanotube sheet 20 is subjected to the tackiness-applying treatment. According to such an arrangement, one of the spacers whose surface in contact with the carbon nanotube sheet 20 is not subjected to the tackiness-applying treatment can be easily peeled off from the carbon nanotube sheet 20. Further, the surface of the spacer(s) not subjected to the tackiness-applying treatment and in contact with the carbon nanotube sheet 20 may be subjected to a release treatment.

Figure 10:
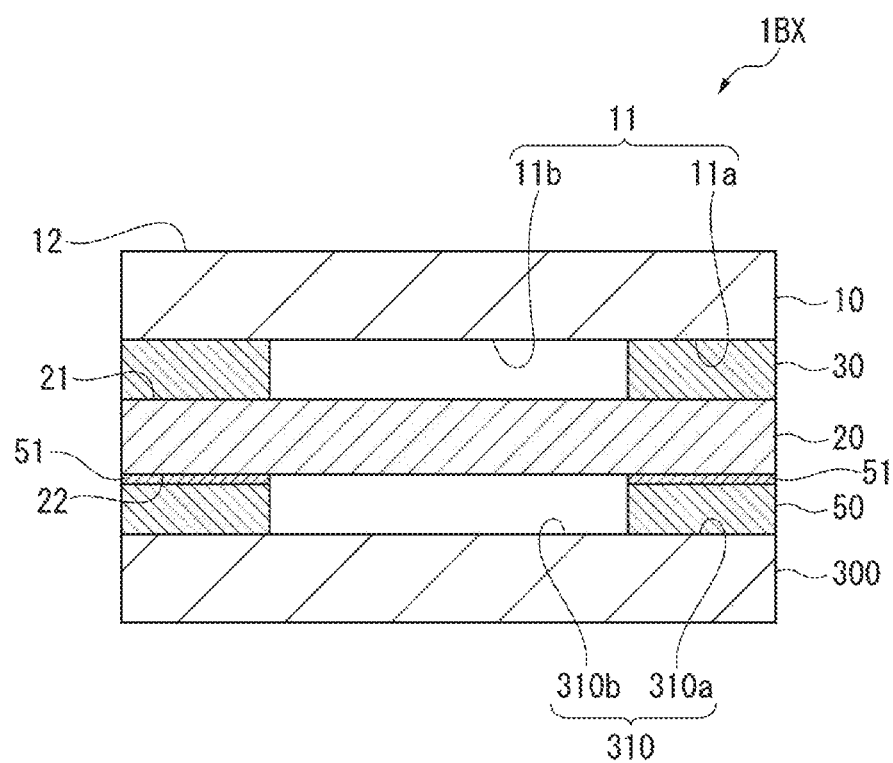
FIG. 10 is a cross section of a carbon nanotube sheet structure according to a modification of the third exemplary embodiment.

For instance, FIG. 10 shows a cross section of a carbon nanotube sheet structure 1BX. In the carbon nanotube sheet structure 1BX, a surface of the second spacer 50 in contact with the carbon nanotube sheet 20 is subjected to the tackiness-applying treatment to form the tackiness-applied portion 51. A surface of the first spacer 30 in contact with the carbon nanotube sheet 20 is not subjected to the release treatment. With the carbon nanotube sheet structure 1BX, the first base material 10 and the first spacer 30 can be easily peeled off from the carbon nanotube sheet 20.

Figure 11:
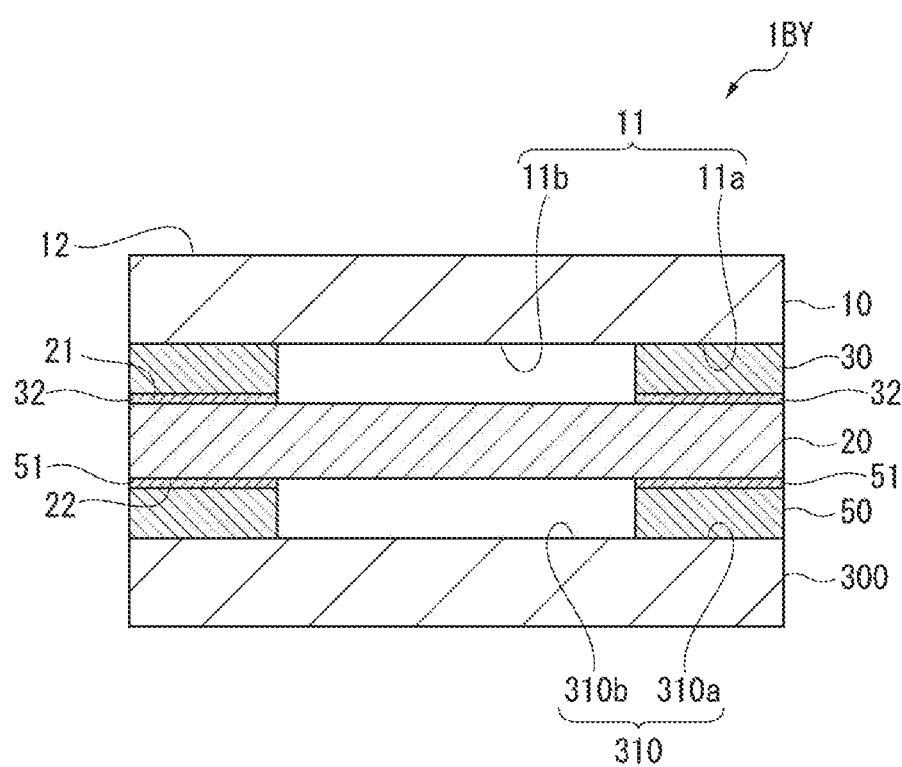
FIG. 11 is a cross section of a carbon nanotube sheet structure according to another modification of the third exemplary embodiment.

As another example, FIG. 11 shows a cross section of a carbon nanotube sheet structure 1BY. In the carbon nanotube sheet structure 1BY, a surface of the second spacer 50 in contact with the carbon nanotube sheet 20 is subjected to the tackiness-applying treatment to form the tackiness-applied portion 51. A surface of the first spacer 30 in contact with the carbon nanotube sheet 20 is subjected to the release treatment to form a releasable portion 32. With the carbon nanotube sheet structure 1BY, the first base material 10 and the first spacer 30 can be easily peeled off from the carbon nanotube sheet 20.

The carbon nanotube sheet structure 1B of the third exemplary embodiment offers the same advantages as those of the carbon nanotube sheet structure 1 according to the first exemplary embodiment.

In addition, according to the carbon nanotube sheet structure 1B of the third exemplary embodiment, since both of the first sheet surface 21 and the second sheet surface 22 of the carbon nanotube sheet 20 are protected by the first base material 10 and the third base material 300 via the spacers, the carbon nanotube sheet 20 is kept from being torn by an impact from an outside during storage and/or transportation.

Further, according to the carbon nanotube sheet structure 1B of the third exemplary embodiment, the region on the first sheet surface 21 of the carbon nanotube sheet 20 facing the second region 11b is not in contact with the first base material 10 and the region on the second sheet surface 22 facing the fourth region 310b is not in contact with the third base material 300, whereby the free-standing condition is kept. Unlike an instance in which the carbon nanotube sheet structures 1 of the first exemplary embodiment are stacked, the free-standing condition of the carbon nanotube sheet 20 is maintained even when the carbon nanotube sheet structures 1B are stacked. Accordingly, the carbon nanotube sheet structure 1B can be easily stored or transported while keeping the free-standing condition of the carbon nanotube sheet 20. In other words, the laminate in which the carbon nanotube sheet structures 1B are layered can keep the free-standing condition of the carbon nanotube sheet 20.

The position of the first spacer 30 disposed between the first base material 10 and the carbon nanotube sheet 20 and the position of the second spacer 50 disposed between the third base material 300 and the carbon nanotube sheet 20 are aligned in a cross section of the carbon nanotube sheet structure 1B in the thickness direction. Since the position of the first spacer 30 and the position of the second spacer 50 are thus aligned, the region of the carbon nanotube sheet 20 pressed by the spacers can be reduced when a plurality of the carbon nanotube sheet structures 1B are stacked or the elongated carbon nanotube sheet structure 1B is wound.

Fourth Exemplary Embodiment

A carbon nanotube sheet structure according to a fourth exemplary embodiment will be described below.

In the description of the fourth exemplary embodiment, the same reference sign and/or name will be attached to the same components as those in the above-described exemplary embodiment(s) to omit or simplify the description. Further, the feature(s) (including specific example(s)) not explicitly mentioned in the fourth exemplary embodiment may be the same as those in the above-described exemplary embodiment(s).

Figure 12:
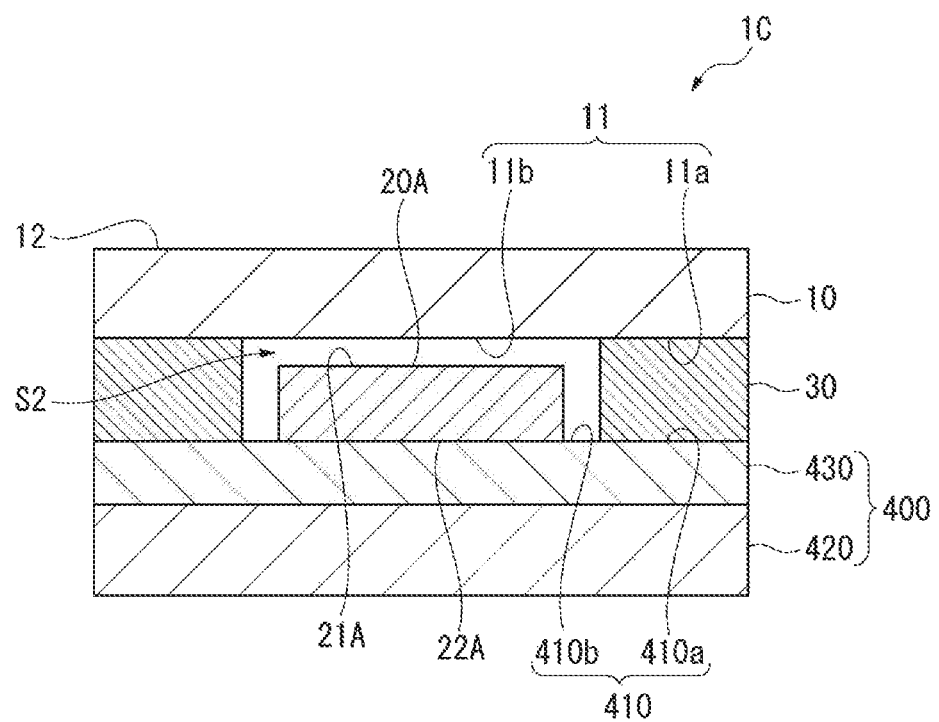
FIG. 12 is a cross section of a carbon nanotube sheet structure according to a fourth exemplary embodiment.

FIG. 12 is a cross section of a carbon nanotube sheet structure 1C according to the fourth exemplary embodiment.

The carbon nanotube sheet structure 1C according to the fourth exemplary embodiment differs from the carbon nanotube sheet structure 1A in the second exemplary embodiment in that, while the carbon nanotube sheet 20 of the carbon nanotube sheet structure 1A is provided on the first spacer 30, a carbon nanotube sheet 20A of the fourth exemplary embodiment is not disposed on the first spacer 30 but on a fourth base material 400.

In the fourth exemplary embodiment, the first base material 10 and the first spacer 30 are the same as those in the first exemplary embodiment.

The carbon nanotube sheet structure 1C includes the carbon nanotube sheet 20A, the first base material 10, the first spacer 30 and the fourth base material 400. In the carbon nanotube sheet structure 1C, the fourth base material 400, the carbon nanotube sheet 20A or the first spacer 30 and the first base material 10 are layered in this order. The carbon nanotube sheet 20A is housed in a region S2 defined by the first base material 10, the first spacer 30 and the fourth base material 400 in the cross section shown in FIG. 12.

Carbon Nanotube Sheet

The carbon nanotube sheet 20A according to the fourth exemplary embodiment is the same as the carbon nanotube sheet 20 used in the first exemplary embodiment except that the carbon nanotube sheet 20A is in a size capable of being housed within the region S2. The carbon nanotube sheet 20A includes a first sheet surface 21A facing the first base material 10, and a second sheet surface 22A opposite the first sheet surface 21A. In the fourth exemplary embodiment, the carbon nanotube sheet 20A is spaced apart from the first base material 10 and the first spacer 30 and is disposed on the fourth base material 400.

Fourth Base Material

The fourth base material 400 includes a fifth base material surface 410 facing the first base material surface 11 of the first base material 10. The fifth base material surface 410 includes a fifth region 410a on which the first spacer 30 is provided and a sixth region 410b on which the first spacer 30 is not provided. The carbon nanotube sheet 20A is disposed on the sixth region 410b of the fifth base material surface 410 on the second sheet surface 22A. In the fourth exemplary embodiment, when the surface of the first spacer 30 in contact with the fourth base material 400 is subjected to the tackiness-applying treatment, the first spacer 30 is bonded to the fifth region 410a of the fifth base material surface 410 so that the first spacer 30 is fixed to the fifth base material surface 410. For instance, when the carbon nanotube sheet structure as an elongated article in its entirety is wound, the deviation caused between the first spacer 30 and the fifth region 410a of the fifth base material surface 410, whose contact areas become relatively small, can be easily avoided as long as the first spacer 30 is bonded to the fifth region 410a of the fifth base material surface 410. In order to easily remove the first base material 10 and the first spacer 30 from the fourth base material 400 and the carbon nanotube sheet 20A disposed on the fourth base material 400, it is preferable that the tackiness-applying treatment is applied on the surface of the first spacer 30 so that the tackiness-applied portion can be easily peeled off from the surface of the fourth base material 400. In the carbon nanotube sheet structure 1C, the second sheet surface 22A is covered with the fourth base material 400 to be protected.

It is preferable that the fifth base material surface 410 exhibits releasability. When the fifth base material surface 410 exhibits releasability, the fourth base material 400 can be easily peeled off from the carbon nanotube sheet structure 1C. The method for applying releasability to the fifth base material surface 410 is not limited. When the surface of the first spacer 30 in contact with the fourth base material 400 is subjected to the tackiness-applying treatment, not only the sixth region 410b but also the fifth region 410a may be subjected to the release treatment. With such an arrangement, the first base material 10 and the first spacer 30 can be easily removed from the fourth base material 400 and the carbon nanotube sheet 20A disposed on the fourth base material 400.

In the fourth exemplary embodiment, the fourth base material 400 includes a releasable base material 420, and a release agent layer 430 formed on a surface of the releasable base material 420. The surface of the release agent layer 430 corresponds to the fifth base material surface 410. The release agent layer 430 may be formed only on one surface of the releasable base material 420 or may be formed on both surfaces of the releasable base material 420. The releasable base material 420 is made of the same material as that of the releasable base material 220. The release agent layer 430 is made of the same material as that of the release agent layer 230.

The carbon nanotube sheet structure 1C of the fourth exemplary embodiment offers the same advantages as those in the carbon nanotube sheet structure 1 of the first exemplary embodiment and the carbon nanotube sheet structure 1A of the second exemplary embodiment except that the carbon nanotube sheet 20 can be held in the carbon nanotube sheet structure 1 while keeping a part of the carbon nanotube sheet 20 in the free-standing condition.

For instance, when the carbon nanotube sheet is disposed on the spacer, the carbon nanotube sheet at the region of the spacer may sometimes be unusable depending on the material and the like of the spacer. In contrast, in the carbon nanotube sheet structure 1C of the fourth exemplary embodiment, the carbon nanotube sheet 20A is not disposed on the first base material 10 and the first spacer 30. Accordingly, the carbon nanotube sheet 20A can be directly used after peeling off the carbon nanotube sheet 20A from the fourth base material 400 without requiring the removal of the region disposed on the spacer.

Fifth Exemplary Embodiment

A carbon nanotube sheet structure according to a fifth exemplary embodiment will be described below.

In the description of the fifth exemplary embodiment, the same reference sign and/or name will be attached to the same components as those in the above-described exemplary embodiments to omit or simplify the description. Further, the feature(s) (including specific example(s)) not explicitly mentioned in the fifth exemplary embodiment may be the same as that in the above-described exemplary embodiments.

Figure 13:
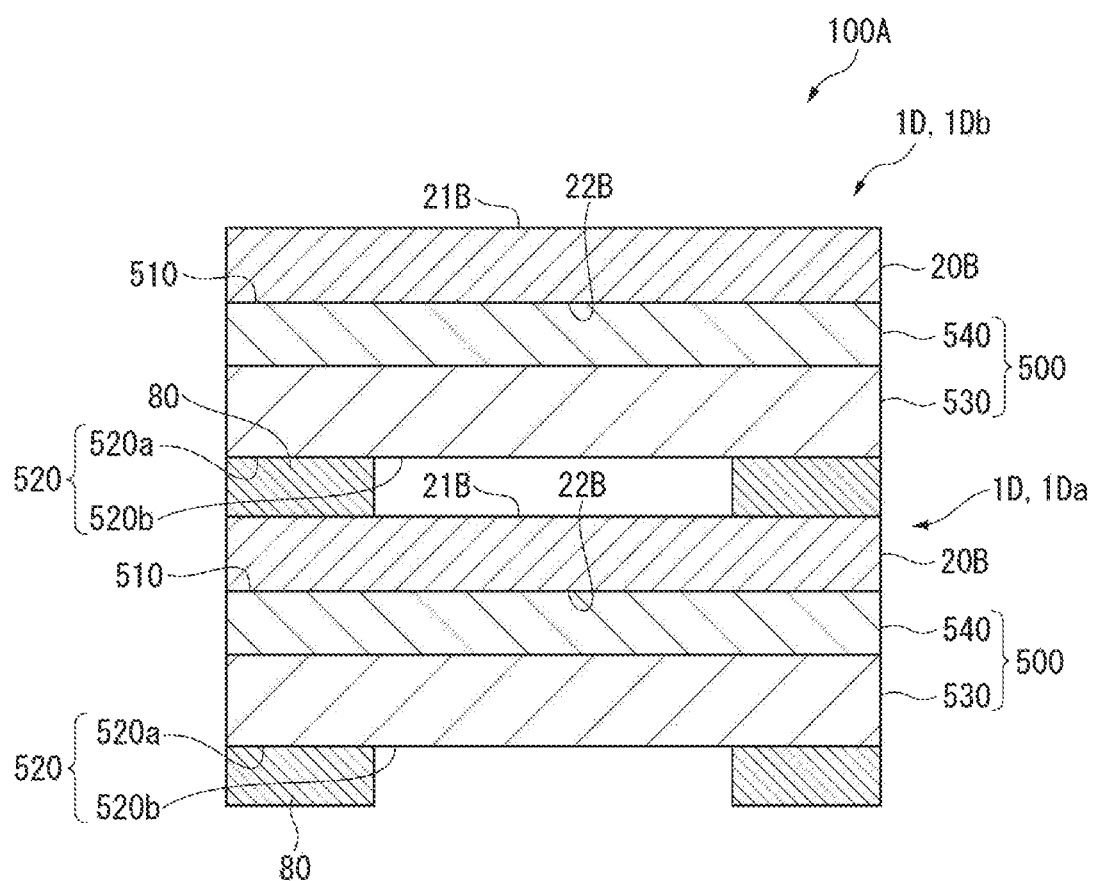
FIG. 13 is a cross section of a carbon nanotube sheet structure and a laminate according to a fifth exemplary embodiment.

FIG. 13 is a cross section of a laminate 100A provided by layering carbon nanotube sheet structures 1D according to the fifth exemplary embodiment. It should be noted that, though a structure shown in FIG. 13 includes two layered carbon nanotube sheet structures 1D (a first carbon nanotube sheet structure 1Da and a second carbon nanotube sheet structure 1Db) for the convenience of explanation, three or more carbon nanotube sheet structures 1D may be layered or, when the carbon nanotube sheet structure 1D is an elongated article, the carbon nanotube sheet structure 1D may be wound three or more times to form the laminate.

The carbon nanotube sheet structure 1D includes a carbon nanotube sheet 20B, a fifth base material 500 and a third spacer 80. In the carbon nanotube sheet structure 1D, the third spacer 80, the fifth base material 500 and the carbon nanotube sheet 20B are layered in this order.

Carbon Nanotube Sheet

The carbon nanotube sheet 20B of the fifth exemplary embodiment includes a first sheet surface 21B and a second sheet surface 22B opposite the first sheet surface 21B. The carbon nanotube sheet 20B is disposed on the fifth base material 500 on the second sheet surface 22B. In the carbon nanotube sheet structure 1D, the second sheet surface 22B is covered with the fifth base material 500 to be protected. No other component is provided on the first sheet surface 21B when the carbon nanotube sheet structure 1D is singly provided, where the first sheet surface 21B of the carbon nanotube sheet 20B is exposed. When the carbon nanotube sheet structures 1D are layered to provide the laminate 100A, the carbon nanotube sheet 20B is disposed on the third spacer 80 at a part of the first sheet surface 21B.

Fifth Base Material

The fifth base material 500 includes a sixth base material surface 510 facing the second sheet surface 22B of the carbon nanotube sheet 20B and a seventh base material surface 520 opposite the sixth base material surface 510. The third spacer 80 is formed on the seventh base material surface 520 of the fifth base material 500. The seventh base material surface 520 includes a seventh region 520a on which the third spacer 80 is provided and an eighth region 520b on which the third spacer 80 is not provided.

It is preferable that the sixth base material surface 510 exhibits releasability. When the sixth base material surface 510 exhibits releasability, the fifth base material 500 can be easily peeled off from the carbon nanotube sheet structure 1D. The method for applying releasability to the sixth base material surface 510 is not limited.

In the fifth exemplary embodiment, the fifth base material 500 includes a releasable base material 530, and a release agent layer 540 formed on a surface of the releasable base material 530. The surface of the release agent layer 540 corresponds to the sixth base material surface 510. The releasable base material 530 is made of the same material as that of the releasable base material 220. The release agent layer 540 is made of the same material as that of the release agent layer 230. It is preferable that the release agent layer 540 is provided only on one surface of the releasable base material 530 and a treatment for enhancing adhesion with the third spacer 80 is applied to the other surface of the releasable base material 530. The surface treatment for enhancing the adhesion and the tackiness-applying treatment may be the same as described above. The seventh region 520a provided with the third spacer 80 may be applied with a surface treatment (e.g. a primer treatment) or a tackiness-applying treatment in the same manner as the first region 11a of the first base material surface 11 in the first exemplary embodiment.

When the carbon nanotube sheet 20B is disposed on the fifth base material 500, the surface roughness $Ra_1$ of the sixth base material surface 510 is preferably 0.05 μm or more, more preferably in a range from 0.05 μm to 10 μm.

With the surface roughness $Ra_1$ of the sixth base material surface 510 being 0.05 μm or more, the carbon nanotube sheet 20B that has been in contact with the sixth base material surface 510 can be easily peeled off without being torn. The surface roughness $Ra_1$ of the sixth base material surface 510 is preferably 0.1 μm or more, more preferably 0.15 μm or more.

The surface roughness $Ra_1$ of the sixth base material surface 510 is preferably 10 μm or less. When the surface roughness $Ra_1$ of the sixth base material surface 510 if 10 μm or less, the flatness of the sixth base material surface 510 is kept at an appropriate level. Accordingly, the occurrence of defects (e.g. tear of the carbon nanotube sheet 20) resulted from irregularities on the sixth base material surface 510 can be restrained. The surface roughness $Ra_1$ of the sixth base material surface 510 is more preferably 5 μm or less, further more preferably 3 μm or less.

Third Spacer

The third spacer 80 is a component of the laminate 100A, in which a plurality of the carbon nanotube sheet structures 1D are layered, for providing a gap between the carbon nanotube sheet 20B of the first carbon nanotube sheet structure 1Da and the fifth base material 500 of the second carbon nanotube sheet structure 1Db layered on the first carbon nanotube sheet structure 1Da. As shown in FIG. 13, the first sheet surface 21B of the first carbon nanotube sheet structure 1Da of the carbon nanotube sheet 20B is spaced apart from the eighth region 520b of the fifth base material 500 of the second carbon nanotube sheet structure 1Db when the carbon nanotube sheet structures are layered.

The third spacer 80 is the same as the first spacer 30 in the first exemplary embodiment except that the third spacer 80 is provided on the seventh base material surface 520 of the fifth base material 500.

The carbon nanotube sheet structure 1D of the fifth exemplary embodiment offers the same advantages as those of the carbon nanotube sheet structure 1 according to the first exemplary embodiment and the carbon nanotube sheet structure 1A according to the second exemplary embodiment when being layered in a form of, for instance, the laminate 100A.

Specifically, though the carbon nanotube sheet structure 1D in itself is not provided with a component corresponding to the first base material 10 in the first and second exemplary embodiments, the fifth base material 500 is disposed through the third spacer 80 when another carbon nanotube sheet structure 1D is layered on the carbon nanotube sheet 20B or the carbon nanotube sheet structure 1D in a form of the elongated article is wound. Accordingly, both sides of the carbon nanotube sheet 20B of the laminate 100A are protected by the fifth base material 500.

Further, according to the carbon nanotube sheet structure 1D of the fifth exemplary embodiment, it is not necessary to provide a base material for protecting the carbon nanotube sheet 20B in addition to the fifth base material 500, thereby saving materials and labor for production.

Modification(s) of Exemplary Embodiment(s)

It should be understood that the scope of the present invention is not limited to the above-described exemplary embodiments, but encompasses modification(s) and improvement(s) as long as such modification(s) and improvements) are compatible with an object of the invention. It should be noted that the same reference signs and names are used in the description below for the same components and features described in the above-described embodiments to omit or simplify the explanations thereof.

Modification of Second Exemplary Embodiment

Figure 14:
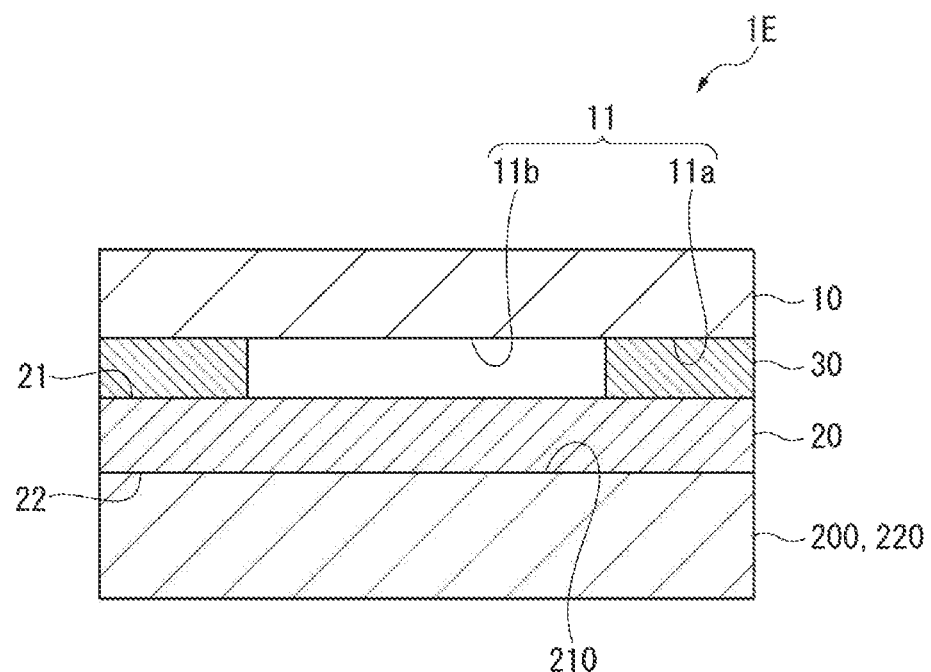
FIG. 14 is a cross section of a carbon nanotube sheet structure according to a modification of the second exemplary embodiment.

Though the second base material 200 exemplarily includes the releasable base material 220 and the release agent layer 230 in the second exemplary embodiment, the scope of the invention is not limited by the specific embodiment. For instance, as in a carbon nanotube sheet structure 1E shown in FIG. 14, it is not necessary for the second base material 200 to include the release agent layer. The second base material 200 includes solely the releasable base material 220, where the releasable base material 220 is made of a material with releasability and the releasable base material 220 is exposed to define the third base material surface 210 in some embodiments of the invention. Examples of the releasable material include fluorine resin film. Examples of the fluorine resin film include tetrafluoroethylene.pentafluoropropylene copolymer film and ethylene.tetrafluoroethylene copolymer film. It should be noted that the releasable material may also be used in instances, where: the second base material surface 12 of the first base material 10 opposite the first base material surface 11 in the first exemplary embodiment has releasability; the surface of the spacer in contact with the carbon nanotube sheet 20 in the third exemplary embodiment is not subjected to the tackiness-applying treatment but is subjected to a release treatment; and the sixth base material surface 510 in the fifth exemplary embodiment has releasability. It is preferable that the surface roughness $Ra_1$ of the surface of the base material or the spacer that is in contact with the carbon nanotube sheet and is adapted to be subjected to the release treatment if 0.05 μm or more. When the surface roughness $Ra_1$ of the surface adapted to be subjected to the release treatment if 0.05 μm or more, the carbon nanotube sheet that has been in contact with the surface adapted to be subjected to the release treatment can be easily peeled off without being torn. The surface roughness $Ra_1$ of the surface adapted to be subjected to the release treatment is preferably 0.1 μm or more, more preferably 0.15 μm or more.

When the surface roughness $Ra_1$ of the third base material surface 210 is 0.05 μm or more, the second base material 200 (the releasable base material 220) can be easily peeled off without tearing the carbon nanotube sheet 20 when the second base material 200 is peeled off from the carbon nanotube sheet 20. The surface roughness $Ra_1$ of the third base material surface 210 in the carbon nanotube sheet structure 1E is preferably 0.1 μm or more, more preferably 0.15 μm or more. The surface roughness $Ra_1$ of the third base material surface 210 of the carbon nanotube sheet structure 1E is preferably 10 μm or less. When the surface roughness $Ra_1$ of the third base material surface 210 if 10 μm or less, the flatness of the third base material surface 210 is kept at an appropriate level. Accordingly, the occurrence of defects (e.g. tear of the carbon nanotube sheet 20) resulted from irregularities on the third base material surface 210 can be restrained. The surface roughness $Ra_1$ of the third base material surface 210 is more preferably 5 μm or less, further more preferably 3 μm or less.

Modification of Fourth Exemplary Embodiment

Figure 15:
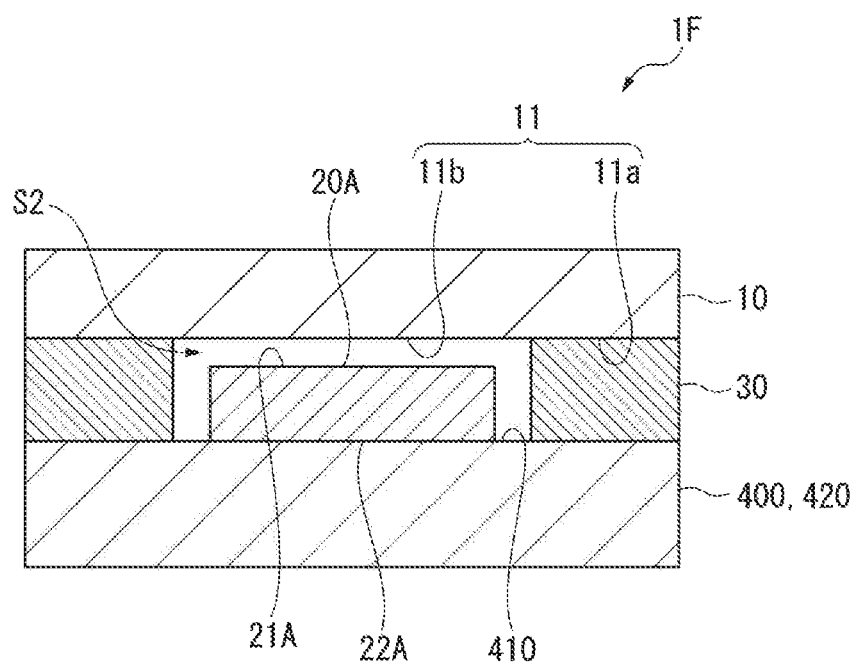
FIG. 15 is a cross section of a carbon nanotube sheet structure according to a modification of the fourth exemplary embodiment.

Though the fourth base material 400 exemplarily includes the releasable base material 420 and the release agent layer 430 in the fourth exemplary embodiment, the scope of the invention is not limited by the specific embodiment. For instance, as in the carbon nanotube sheet structure 1F shown in FIG. 15, it is not necessary for the fourth base material 400 to include the release agent layer but the fourth base material 400 includes solely the releasable base material 420, where the releasable base material 420 is made of a material with releasability and the releasable base material 420 is exposed to define the fifth base material surface 410 in some embodiments of the invention. Examples of the material with releasability are the same as those mentioned in the modification of the second exemplary embodiment. In this modification, it is preferable that the surface roughness $Ra_1$ of a surface corresponding to the fifth base material surface 410, in other words, the surface of the releasable base material 420 on which the carbon nanotube sheet 20A is disposed, if 0.05 μm or more, more preferably 0.1 μm or more and further more preferably 0.15 μm or more. With the surface roughness $Ra_1$ of the surface of the releasable base material 420, on which the carbon nanotube sheet 20A is disposed, if 0.05 μm or more, the carbon nanotube sheet 20A can be easily peeled off without being torn.

In the carbon nanotube sheet structure 1F, it is preferable that the surface roughness $Ra_1$ of the surface of the releasable base material 420 on which the carbon nanotube sheet 20A is disposed if 10 μm or less, more preferably 5 μm or less and further more preferably 3 μm or less. When the surface roughness $Ra_1$ of the surface provided thereon with the carbon nanotube sheet 20A of the releasable base material 420 if 10 μm or less, the flatness of the sixth base material surface 510 is kept at an appropriate level. Accordingly, the occurrence of defects (e.g. tear of the carbon nanotube sheet 20) resulted from irregularities on the surface provided thereon with the carbon nanotube sheet 20A of the releasable base material 420 can be restrained.

Modification of Fifth Exemplary Embodiment

Figure 16:
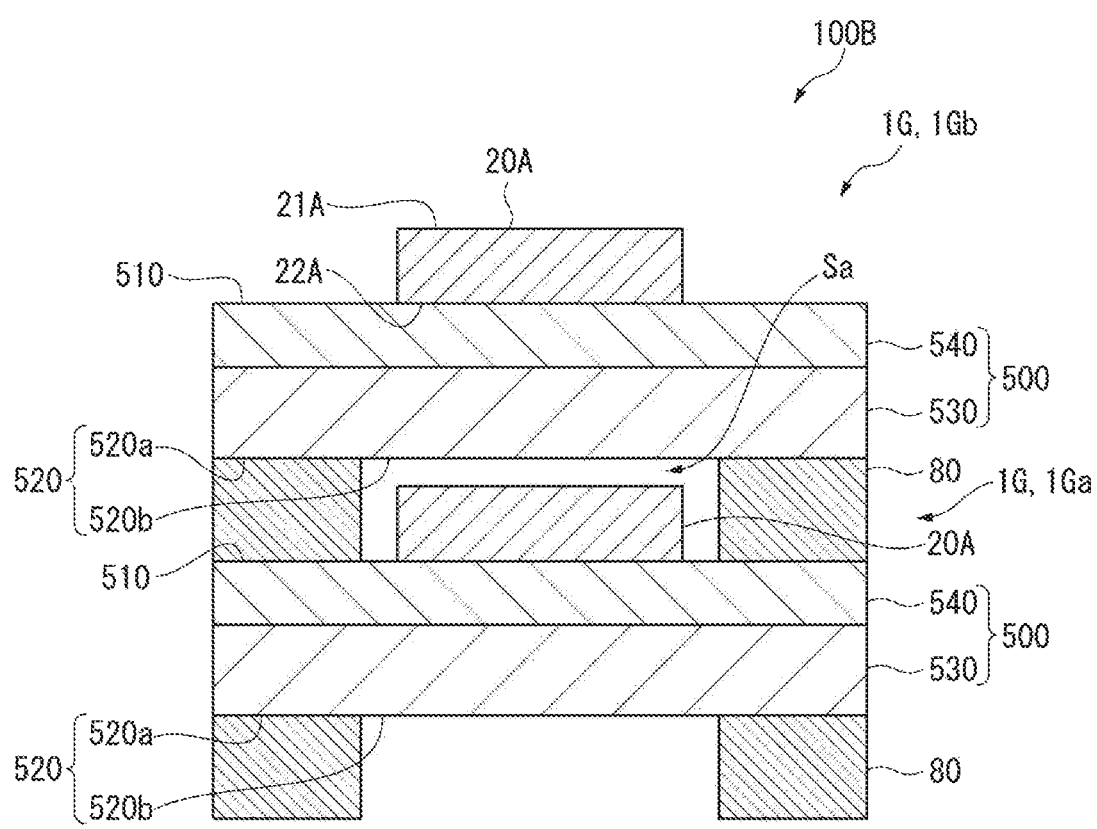
FIG. 16 is a cross section of a carbon nanotube sheet structure and a laminate according to a modification of the fifth exemplary embodiment.

In the laminate 100A according to the fifth exemplary embodiment, the carbon nanotube sheet 20B disposed on the fifth base material 500 of the first carbon nanotube sheet structure 1Da is also exemplarily disposed on the third spacer 80 of the second carbon nanotube sheet structure 1Db, the scope of the invention is not limited to the specific example. For instance, a carbon nanotube sheet structure 1G and a laminate 100B shown in FIG. 16 are provided in some embodiments of the invention. The laminate 100B has a structure in which two carbon nanotube sheet structures 1G (a first carbon nanotube sheet structure 1Ga and a second carbon nanotube sheet structure 1Gb) are layered. Each of the first and second carbon nanotube sheet structures 1Ga, 1Gb includes the carbon nanotube sheet 20A, the fifth base material 50, and the third spacer 80. The carbon nanotube sheet 20A of the carbon nanotube sheet structure 1G is not disposed on the third spacer 80 when being layered but is housed within a region Sa defined by two fifth base materials 500 and the third spacer 80 as shown in a cross section in FIG. 16. The carbon nanotube sheet structure 1G thus offers the same advantages as those in the fourth and fifth exemplary embodiments. It should be noted that, when the laminate is obtained by layering the carbon nanotube sheet structures 1G, three or more carbon nanotube sheet structures 1G may be layered or, when the carbon nanotube sheet structure 1G is an elongated article, the carbon nanotube sheet structure 1G may be wound for three or more times.

Modification of First Exemplary Embodiment

Though the first spacer 30 is exemplarily interposed between the first base material 10 and the carbon nanotube sheet 20 in the first exemplary embodiment, the scope of the invention is not limited by the specific embodiment.

Figure 17:
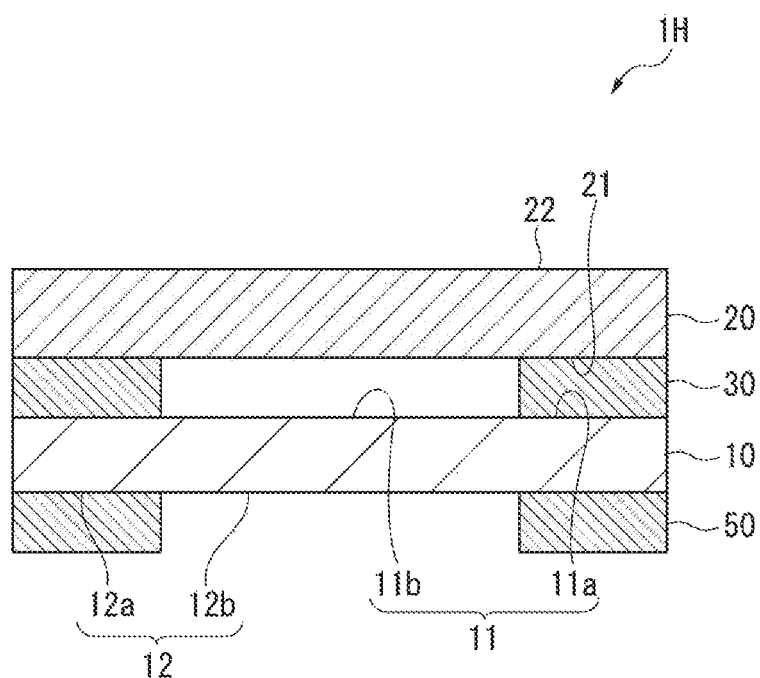
FIG. 17 is a cross section of a carbon nanotube sheet structure according to a further modification of the first exemplary embodiment.

For instance, a carbon nanotube sheet structure 1H shown in FIG. 17 is provided in some embodiments of the invention. In the carbon nanotube sheet structure 1H, the second spacer 50 is additionally formed on the second base material surface 12 of the first base material 10 of the carbon nanotube sheet structure 1 in the first exemplary embodiment. The second base material surface 12 includes a ninth region 12a on which the second spacer 50 is provided and a tenth region 12b on which the second spacer 50 is not provided. The ninth region 12a may be applied with a surface treatment (e.g. a primer treatment) or a tackiness-applying treatment in the same manner as the first region 11a of the first base material surface 11.

The second spacer 50 of the carbon nanotube sheet structure 1H is a component for providing a gap between the carbon nanotube sheet 20 and the first base material 10 when a plurality of the carbon nanotube sheet structures 1H are layered. The second spacer 50 is the same as the first spacer 30 in the first exemplary embodiment.

In the carbon nanotube sheet structure 1H, the position of the first spacer 30 and the position of the second spacer 50 are aligned in the cross section in the thickness direction of the carbon nanotube sheet structure 1H. It should be noted that it is only necessary that the spacers are aligned so that the carbon nanotube sheet 20 is restrained from being deformed or damaged when being pressed by the spacers in the plurality of layered carbon nanotube sheet structures 1H. It is preferable that the spacers are aligned so that the positions of the spacers are matched in the cross section of the carbon nanotube sheet structure.

The carbon nanotube sheet structure 1H offers the same advantages as those of the carbon nanotube sheet structure 1 according to the first exemplary embodiment.

Figure 18:
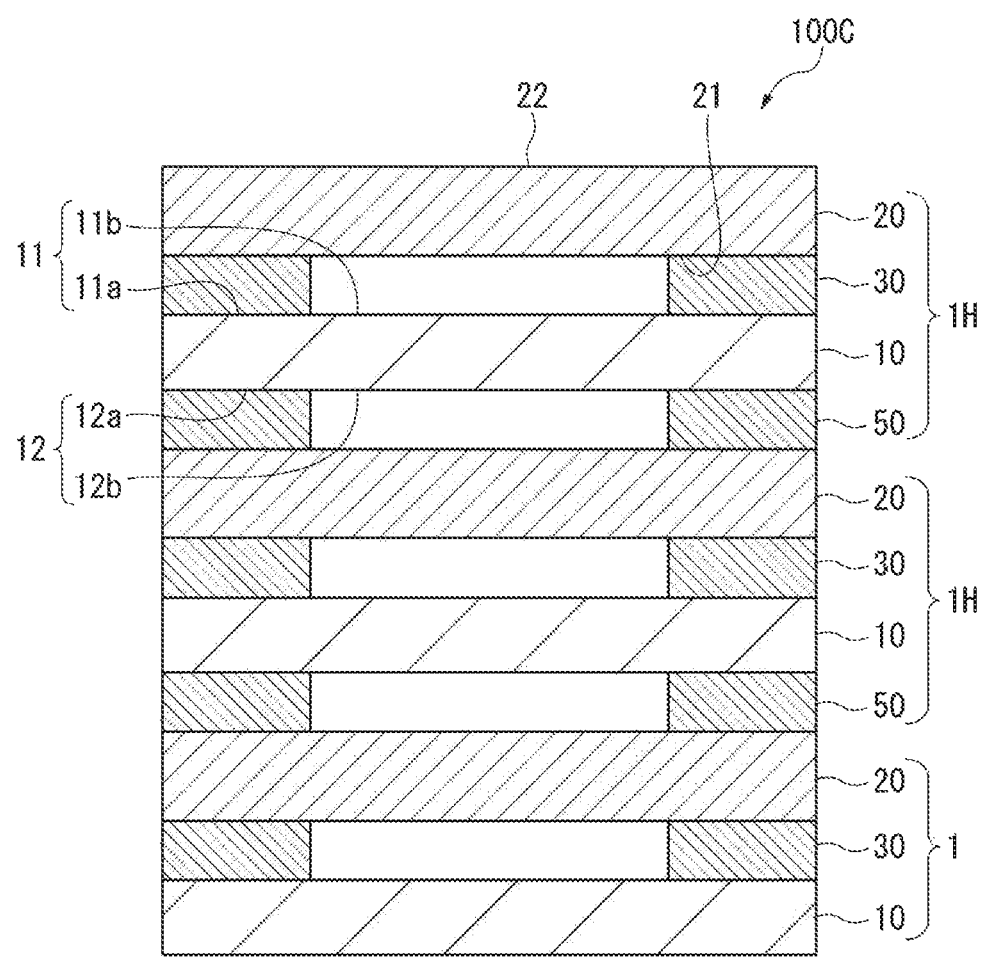
FIG. 18 is a cross section of a carbon nanotube sheet structure according to a still further modification of the first exemplary embodiment.

FIG. 18 shows a cross section of a laminate 1000 in which a plurality of the carbon nanotube sheet structures 1H are layered. It should be noted that the carbon nanotube sheet structure 1 may be layered at the lowermost of the laminate 100C as shown in FIG. 18.

According to the laminate 100C, even when the third base material 300 of the carbon nanotube sheet structure 1B in the third exemplary embodiment is omitted, the free-standing condition of the carbon nanotube sheet 20 is maintained. Accordingly, the laminate 100C allows the carbon nanotube sheet structure 1H to be easily stored or transported while keeping the free-standing condition of the carbon nanotube sheet 20. In addition, since the first base material 10 functions as the third base material 300 in the laminate 100C, a component corresponding to the third base material 300 can be omitted and the thickness and weight of the laminate can be reduced.

Modification of Third Exemplary Embodiment

Though the third base material 300 in the third exemplary embodiment is exemplified by a component made of the same material as the first base material 10 in the first exemplary embodiment, the third base material 300 is made of a material different from the material of the first base material 10 in the first exemplary embodiment in a carbon nanotube sheet structure in some embodiments of the invention.

Though the second spacer 50 in the modification of the first exemplary embodiment and in the third exemplary embodiment is exemplified by the same component as the first spacer 30 in the first exemplary embodiment, the second spacer 50 and the first spacer 30 are different from each other in terms of at least one of material, thickness, and shape in a carbon nanotube sheet structure in some embodiments of the invention.

The invention claimed is:

1. A carbon nanotube sheet structure comprising:
a carbon nanotube sheet comprising a plurality of carbon nanotubes arrayed preferentially in one direction in a sheet surface;
a first base material comprising a first base material surface facing the carbon nanotube sheet; and
a first spacer configured to provide a gap between the carbon nanotube sheet and the first base material, wherein
the first base material surface of the first base material comprises:
a first region on which the first spacer is provided; and
a second region on which the first spacer is not provided,
the first base material is spaced apart from the carbon nanotube sheet at the second region of the first base material surface,
the first base material comprises a second base material surface opposite the first base material surface,
the second base material surface has releasability in order for the carbon nanotube sheet structure to be removed from another carbon nanotube sheet structure adapted to be stacked on the second base material surface of the first base material, the carbon nanotube sheet structure has at least one of a first release agent layer provided between the first base material and the first spacer, and a second release agent layer provided between the first spacer and the carbon nanotube sheet, and the first and second release agent layers each have a thickness ranging from 0.01 µm to 2.0 µm.

2. The carbon nanotube sheet structure according to claim 1, wherein the carbon nanotube sheet comprises:
   a first sheet surface on which the first spacer is provided; and
   a second sheet surface opposite the first sheet surface, and
   the carbon nanotube sheet structure further comprises a second base material comprising a third base material surface facing the second sheet surface of the carbon nanotube sheet.

3. The carbon nanotube sheet structure according to claim 2, wherein the carbon nanotube sheet is disposed on the third base material surface.

4. The carbon nanotube sheet structure according to claim 3, wherein a surface roughness $Ra_1$ of the third base material surface is 0.05 µm or more.

5. The carbon nanotube sheet structure according to claim 4, wherein a surface roughness $Ra_1$ of the third base material surface is 10 µm or less.

6. The carbon nanotube sheet structure according to claim 1, wherein the carbon nanotube sheet comprises:
   a first sheet surface on which the first spacer is provided; and
   a second sheet surface opposite the first sheet surface, and
   the carbon nanotube sheet structure further comprises a third base material comprising a third base material surface facing the second sheet surface of the carbon nanotube sheet; and
   a third spacer configured to provide a gap between the carbon nanotube sheet and the third base material,
   the third base material surface of the third base material comprises:
     a third region on which the third spacer is provided; and
     a fourth region on which the third spacer is not provided,
   the third base material is spaced apart from the carbon nanotube sheet in the fourth region of the third base material surface, and
   a position of the first spacer disposed between the first base material and the carbon nanotube sheet and a position of the third spacer disposed between the third base material and the carbon nanotube sheet are aligned in a cross section of the carbon nanotube sheet structure in a thickness direction.

7. A carbon nanotube sheet structure comprising:
   a first base material comprising a first base material surface;
   a second base material comprising a second base material surface facing the first base material surface of the first base material;
   a first spacer disposed between the first base material and the second base material; and
   a carbon nanotube sheet disposed between the first base material and the second base material, wherein
   the carbon nanotube sheet comprises a plurality of carbon nanotubes arrayed preferentially in one direction in a sheet surface, the first base material surface of the first base material comprises:
   a first region on which the first spacer is disposed; and
   a second region on which the first spacer is not disposed,
the second base material surface of the second base material comprises:
   a third region on which the first spacer is disposed; and
   a fourth region on which the first spacer is not disposed,
the carbon nanotube sheet is spaced apart from (1) the second region of the first base material surface and (2) the first spacer, and is disposed on the fourth region of the second base material surface, and
the second base material surface has releasability in order for the second base material to be removed from the carbon nanotube sheet structure.

8. The carbon nanotube sheet structure according to claim 7, wherein a surface roughness $Ra_1$ of the fourth region of the second base material surface is 0.05 µm or more.

9. The carbon nanotube sheet structure according to claim 8, wherein the surface roughness $Ra_1$ of the fourth region of the second base material surface is 10 µm or less.

10. A laminate comprising the carbon nanotube sheet structure according to claim 1, the carbon nanotube sheet structure comprising a plurality of carbon nanotube sheet structures that are layered with each other.

11. A laminate comprising a plurality of carbon nanotube sheet structures that are layered with each other, wherein
   each of the carbon nanotube sheet structures comprises:
     a carbon nanotube sheet comprising a plurality of carbon nanotubes arrayed preferentially in one direction in a sheet surface;
     a first base material comprising a first base material surface facing the carbon nanotube sheet and a second base material surface opposite the first base material surface; and
     a first spacer provided on the second base material surface,
   the second base material surface comprises:
     a first region on which the first spacer is provided; and
     an second region on which the first spacer is not provided,
   while the plurality of carbon nanotube sheet structures are layered with each other, the carbon nanotube sheet is spaced apart from the second region on the second base material surface,
   the first base material surface has releasability in order for the first base material to be removed from corresponding one carbon nanotube sheet structure,
   the carbon nanotube sheet structure has at least one of a first release agent layer provided between the first base material and the first spacer, and a second release agent layer provided between the first spacer and the carbon nanotube sheet, and
   the first and second release agent layers each have a thickness ranging from 0.01 µm to 2.0 µm.

12. The laminate according to claim 11, wherein, in the carbon nanotube sheet structures, the carbon nanotube sheet is disposed on the first base material, and
   a surface roughness $Ra_1$ of the first base material surface is 0.05 µm or more.

13. The laminate according to claim 12, wherein the surface roughness $Ra_1$ of the first base material surface is 10 µm or less.

14. The carbon nanotube sheet structure according to claim 1, wherein the second base material surface has a release agent layer containing a release agent, the release agent layer having the releasability.

15. The carbon nanotube sheet structure according to claim 14, wherein the release agent layer includes at least one resin selected from the group consisting of an olefin resin, a rubber elastomer, a long-chain alkyl resin, an alkyd resin, a fluorine resin, and a silicone resin.

16. The carbon nanotube sheet structure according to claim 7, wherein the second base material surface has a release agent layer containing a release agent, the release agent layer having the releasability.

17. The carbon nanotube sheet structure according to claim 16, wherein the release agent layer includes at least one resin selected from the group consisting of an olefin resin, a rubber elastomer, a long-chain alkyl resin, an alkyd resin, a fluorine resin, and a silicone resin.

18. The laminate according to claim 11, wherein the first base material surface has a release agent layer containing a release agent, the release agent layer having the releasability.

19. The laminate according to claim 18, wherein the release agent layer includes at least one resin selected from the group consisting of an olefin resin, a rubber elastomer, a long-chain alkyl resin, an alkyd resin, a fluorine resin, and a silicone resin.

* * * * *